(12) United States Patent
Barker et al.

(10) Patent No.: US 7,771,628 B2
(45) Date of Patent: *Aug. 10, 2010

(54) ELECTRODES COMPRISING MIXED ACTIVE PARTICLES

(75) Inventors: Jeremy Barker, Oxfordshire (GB); M. Yazid Saidi, Henderson, NV (US); Tracy Kelley, Tuscon, AZ (US)

(73) Assignee: Valence Technology, Inc., Las Vegas, NV (US)

( * ) Notice: Subject to any disclaimer, the term of this patent is extended or adjusted under 35 U.S.C. 154(b) by 1102 days.

This patent is subject to a terminal disclaimer.

(21) Appl. No.: 11/381,602

(22) Filed: May 4, 2006

(65) Prior Publication Data

US 2006/0194112 A1    Aug. 31, 2006

Related U.S. Application Data

(63) Continuation of application No. 10/406,890, filed on Apr. 3, 2003, now Pat. No. 7,041,239.

(51) Int. Cl.
*H01B 1/08* (2006.01)
*H01M 4/58* (2010.01)

(52) U.S. Cl. .............. 252/521.5; 252/521.2; 429/218.1; 429/224

(58) Field of Classification Search ............... 252/518.1, 252/521.5, 521.2; 429/218.1, 224
See application file for complete search history.

(56) References Cited

U.S. PATENT DOCUMENTS

| | | | |
|---|---|---|---|
| 4,194,062 A | 3/1980 | Carides et al. | |
| 4,464,447 A | 8/1984 | Lazzari et al. | |
| 5,028,500 A | 7/1991 | Fong et al. | |
| 5,130,211 A | 7/1992 | Wilkinson et al. | |
| 5,418,090 A | 5/1995 | Koksbang et al. | |
| 5,429,890 A | 7/1995 | Pynenburg et al. | |
| 5,514,490 A | 5/1996 | Chen et al. | |
| 5,538,814 A | 7/1996 | Kamauchi et al. | |
| 5,695,893 A | 12/1997 | Arai et al. | |
| 5,744,265 A | 4/1998 | Barker et al. | |
| 5,783,333 A | 7/1998 | Mayer | |
| 5,789,110 A | 8/1998 | Saidi et al. | |
| 5,804,335 A | 9/1998 | Kamauchi et al. | |
| 5,871,866 A | 2/1999 | Barker et al. | |
| 5,910,382 A | 6/1999 | Goodenough et al. | |
| 6,007,947 A | 12/1999 | Mayer | |
| 6,085,015 A | 7/2000 | Armand et al. | |
| 6,114,062 A * | 9/2000 | Motomura et al. | 429/213 |
| 6,136,472 A | 10/2000 | Barker et al. | |
| 6,153,333 A | 11/2000 | Barker | |
| 6,387,568 B1 | 5/2002 | Barker et al. | |
| 6,447,951 B1 | 9/2002 | Barker et al. | |
| 6,514,640 B1 | 2/2003 | Armand et al. | |
| 6,596,435 B2 | 7/2003 | Kelley et al. | |
| 6,723,470 B2 | 4/2004 | Barker et al. | |
| 6,746,799 B2 | 6/2004 | Yamada et al. | |
| 6,814,894 B2 | 11/2004 | Shoji et al. | |
| 7,041,239 B2 * | 5/2006 | Barker et al. | 252/521.5 |
| 2002/0192553 A1 | 12/2002 | Barker et al. | |
| 2002/0195591 A1 | 12/2002 | Ravet et al. | |
| 2003/0013019 A1 | 1/2003 | Barker et al. | |
| 2003/0190526 A1 | 10/2003 | Saidi et al. | |
| 2003/0190527 A1 | 10/2003 | Pugh et al. | |
| 2003/0190528 A1 | 10/2003 | Saidi et al. | |
| 2004/0005265 A1 | 1/2004 | Chiang et al. | |
| 2004/0029011 A1 | 2/2004 | Ravet et al. | |

FOREIGN PATENT DOCUMENTS

| | | |
|---|---|---|
| WO | WO 00/31812 A1 | 6/2000 |
| WO | WO 00/57505 A1 | 9/2000 |
| WO | WO 01/13443 A2 | 2/2001 |
| WO | WO 01/54212 A1 | 7/2001 |
| WO | WO 01/84655 A1 | 11/2001 |

OTHER PUBLICATIONS

Chemical Abstracts, vol. 2003, Issue 17, Aug. 25, 2003, Batteries & Fuel Cells; 139:71559p; Structure and Cathode Properties of Phospho-Olivine LiCoPO$_4$ for Lithium Secondary Batteries.
NEC Research and Development, vol. 41, No. 1, Jan. 2000, Prismatic Lithium-Ion Rechargeable Battery with Manganese Spinel and Nickel-Cobalt Oxide Cathode, Tsunoda et al.
NEC Research and Development, No. 1, Jan. 2000, Advantages of Blended Electrode for Lithium-Ion Rechargeable Batteries, Numata et al.

* cited by examiner

*Primary Examiner*—Mark Kopec
(74) *Attorney, Agent, or Firm*—Cynthia Kovacevic; Roger A. Williams; Brian T. Manqum

(57) ABSTRACT

Electrode active materials comprising two or more groups of particles having differing chemical compositions, wherein each group of particles comprises a material selected from:
(a) materials of the formula $A^1{}_a M^1{}_b (XY_4)_c Z_d$; and
(b) materials of the formula $A^2{}_e M^2{}_f O_g$; and
(c) materials of the formula $A^3{}_h Mn_i O_4$;
wherein
(i) $A^1$, $A^2$, and $A^3$ are Li, Na, or K;
(ii) $M^1$ and $M^3$ comprise a transition metal;
(iv) $XY_4$ a phosphate or similar moiety; and
(v) Z is OH, or halogen.

4 Claims, No Drawings

ELECTRODES COMPRISING MIXED ACTIVE PARTICLES

This application is a Continuation of application Ser. No. 10/406,890 filed Apr. 3, 2003 now U.S. Pat. No. 7,041,239.

FIELD OF THE INVENTION

This invention relates to electrode active materials, electrodes, and batteries. In particular, this invention relates to mixtures or blends of various active materials that comprise alkali metals, transition metals, oxides, phosphates or similar moieties, halogen or hydroxyl moieties, and combinations thereof.

BACKGROUND OF THE INVENTION

A wide variety of electrochemical cells, or "batteries," are known in the art. In general, batteries are devices that convert chemical energy into electrical energy, by means of an electrochemical oxidation-reduction reaction. Batteries are used in a wide variety of applications, particularly as a power source for devices that cannot practicably be powered by centralized power generation sources (e.g., by commercial power plants using utility transmission lines).

Batteries can be generally described as comprising three components: an anode that contains a material that is oxidized (yields electrons) during discharge of the battery (i.e., while it is providing power); a cathode that contains a material that is reduced (accepts electrons) during discharge of the battery; and an electrolyte that provides for transfer of ions between the cathode and anode. During discharge, the anode is the negative pole of the battery, and the cathode is the positive pole. Batteries can be more specifically characterized by the specific materials that make up each of these three components. Selection of these components can yield batteries having specific voltage and discharge characteristics that can be optimized for particular applications.

Batteries can also be generally categorized as being "primary," where the electrochemical reaction is essentially irreversible, so that the battery becomes unusable once discharged; and "secondary," where the electrochemical reaction is, at least in part, reversible so that the battery can be "recharged" and used more than once. Secondary batteries are increasingly used in many applications, because of their convenience (particularly in applications where replacing batteries can be difficult), reduced cost (by reducing the need for replacement), and environmental benefits (by reducing the waste from battery disposal).

There are a variety of secondary battery systems known in the art. Among the most common systems are lead-acid, nickel-cadmium, nickel-zinc, nickel-iron, silver oxide, nickel metal hydride, rechargeable zinc-manganese dioxide, zinc-bromide, metal-air, and lithium batteries. Systems containing lithium and sodium afford many potential benefits, because these metals are light in weight, while possessing high standard potentials. For a variety of reasons, lithium batteries are, in particular, commercially attractive because of their high energy density, higher cell voltages, and long shelf-life.

Lithium batteries are prepared from one or more lithium electrochemical cells containing electrochemically active (electroactive) materials. Among such batteries are those having metallic lithium anodes and metal chalcogenide (oxide) cathodes, typically referred to as "lithium metal" batteries. The electrolyte typically comprises a salt of lithium dissolved in one or more solvents, typically nonaqueous aprotic organic solvents. Other electrolytes are solid electrolytes (typically polymeric matrixes) that contain an ionic conductive medium (typically a lithium containing salt dissolved in organic solvents) in combination with a polymer that itself may be ionically conductive but electrically insulating.

Cells having a metallic lithium anode and metal chalcogenide cathode are charged in an initial condition. During discharge, lithium metal yields electrons to an external electrical circuit at the anode. Positively charged ions are created that pass through the electrolyte to the electrochemically active (electroactive) material of the cathode. The electrons from the anode pass through the external circuit, powering the device, and return to the cathode.

Another lithium battery uses an "insertion anode" rather than lithium metal, and is typically referred to as a "lithium ion" battery. Insertion or "intercalation" electrodes contain materials having a lattice structure into which an ion can be inserted and subsequently extracted. Rather than chemically altering the intercalation material, the ions slightly expand the internal lattice lengths of the compound without extensive bond breakage or atomic reorganization. Insertion anodes contain, for example, lithium metal chalcogenide, lithium metal oxide, or carbon materials such as coke and graphite. These negative electrodes are used with lithium-containing insertion cathodes. In their initial condition, the cells are not charged, since the anode does not contain a source of cations. Thus, before use, such cells must be charged in order to transfer cations (lithium) to the anode from the cathode. During discharge the lithium is then transferred from the anode back to the cathode. During subsequent recharge, the lithium is again transferred back to the anode where it reinserts. This back-and-forth transport of lithium ions ($Li^+$) between the anode and cathode during charge and discharge cycles had led to these cells as being called "rocking chair" batteries.

A variety of materials have been suggested for use as cathode active materials in lithium ion batteries. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$, $SO_2$, $CuCl_2$. Transition metal oxides, such as those of the general formula $Li_xM_2O_y$, are among those materials preferred in such batteries having intercalation electrodes. Other materials include lithium transition metal phosphates, such as $LiFePO_4$, and $Li_3V_2(PO_4)_3$. Such materials having structures similar to olivine or NASICON materials are among those known in the art. Cathode active materials among those known in the art are disclosed in S. Hossain, "Rechargeable Lithium Batteries (Ambient Temperature)," *Handbook of Batteries*, 3d ed., Chapter 34, Mc-Graw Hill (2002); U.S. Pat. No. 4,194,062, Carides, et al., issued Mar. 18, 1980; U.S. Pat. No. 4,464,447, Lazzari, et al., issued Aug. 7, 1984; U.S. Pat. No. 5,028,500, Fong et al., issued Jul. 2, 1991; U.S. Pat. No. 5,130,211, Wilkinson, et al., issued Jul. 14, 1992; U.S. Pat. No. 5,418,090, Koksbang et al., issued May 23, 1995; U.S. Pat. No. 5,514,490, Chen et al., issued May 7, 1996; U.S. Pat. No. 5,538,814, Kamauchi et al., issued Jul. 23, 1996; U.S. Pat. No. 5,695,893, Arai, et al., issued Dec. 9, 1997; U.S. Pat. No. 5,804,335, Kamauchi, et al., issued Sep. 8, 1998; U.S. Pat. No. 5,871,866, Barker et al., issued Feb. 16, 1999; U.S. Pat. No. 5,910,382, Goodenough, et al., issued Jun. 8, 1999; PCT Publication WO/00/31812, Barker, et al., published Jun. 2, 2000; PCT Publication WO/00/57505, Barker, published Sep. 28, 2000; U.S. Pat. No. 6,136,472, Barker et al., issued Oct. 24, 2000; U.S. Pat. No. 6,153,333, Barker, issued Nov. 28, 2000; PCT Publication WO/01/13443, Barker, published Feb. 22, 2001; and PCT Publication WO/01/54212, Barker et al., published Jul. 26, 2001; PCT Publication WO/01/84655, Barker et al., published Nov. 8, 2001.

In addition to the above-mentioned materials, mixtures of specific active materials have been used as cathode active materials in lithium batteries. The blending of $Li_xMn_2O_4$ (also known as spinel) with various oxides are among those blends known in the art and are disclosed in U.S. Pat. No. 5,429,890, Pynenburg et al., issued Jul. 4, 1995; and U.S. Pat. No. 5,789,1110, Saidi et al., issued Aug. 4, 1998; both incorporated herein by reference. U.S. Pat. No. 5,744,265, Barker, issued Apr. 28, 1998 covers the use of physical blends of $Li_2CuO_2$ with lithium metal chalcogenides. Mixtures of lithium nickel cobalt metal oxide with a lithium manganese metal oxide are disclosed in U.S. Pat. No. 5,783,333, Mayer, issued Jul. 21, 1998; and U.S. Pat. No. 6,007,947, issued Dec. 29, 1999. Further, in a NEC report by Numata et al (NEC Res. Develop. 41, 10, 2000) blended cathodes comprising $Li_xMn_2O_4$ and $LiNi_{0.8}Co_{0.2}O_2$ are disclosed.

In general, such a cathode material must exhibit a high free energy of reaction with lithium, be able to intercalate a large quantity of lithium, maintain its lattice structure upon insertion and extraction of lithium, allow rapid diffusion of lithium, afford good electrical conductivity, not be significantly soluble in the electrolyte system of the battery, and be readily and economically produced. However, many of the cathode materials known in the art lack one or more of these characteristics. As a result, for example, many such materials are not economical to produce, afford insufficient voltage, have insufficient charge capacity, or lose their ability to be recharged over multiple cycles.

SUMMARY OF THE INVENTION

The present invention provides mixtures or "blends" of electrode active materials comprising alkali metals, transition metals, and anions such as oxides, phosphates or similar moieties, halogen or hydroxyl moieties, and combinations thereof. Such electrode active materials comprise groups of particles having different chemical compositions.

In one embodiment, an active material blend comprises two or more groups of particles having differing chemical compositions, wherein each group of particles comprises a material selected from:

(a) materials of the formula $A^1_a M^1_b (XY_4)_c Z_d$;
(b) materials of the formula $A^2_e M^2_f O_g$; and
(c) materials of the formula $A^3_h Mn_i O_4$;

wherein
(i) $A^1$, $A^2$, and $A^3$ are independently selected from the group consisting of Li, Na, K, and mixtures thereof, and $0 < a \leq 8$, $0 < e \leq 6$;
(ii) $M^1$ is one or more metals, comprising at least one metal which is capable of undergoing oxidation to a higher valence state, and $0.8 \leq b \leq 3$;
(iii) $M^2$ is one or more metals, comprising at least one metal selected from the group consisting of Fe, Co, Ni, V, Zr, Ti, Mo and Cr, and $1 \leq f \leq 6$;
(iv) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0 \leq x < 3$; and $0 < y < 2$; and $0 < c \leq 3$;
(v) Z is OH, halogen, or mixtures thereof, and $0 \leq d \leq 6$;
(vi) $0 < g \leq 15$;
(vii) $M^1$, $M^2$, X, Y, Z, a, b, c, d, e, f, g, h, i, x and y are selected so as to maintain electroneutrality of said compound; and (viii) said material of the formula $A^3_h Mn_i O_4$ has an inner and an outer region, wherein the inner region comprises a cubic spinel manganese oxide, and the outer region comprises a manganese oxide that is enriched in $Mn^{+4}$ relative to the inner region.

In a preferred embodiment, $M^1$ and $M^2$ comprise two or more transition metals from Groups 4 to 11 of the Periodic Table. In another preferred embodiment, $M^1$ comprises at least one element from Groups 4 to 11 of the Periodic Table; and at least one element from Groups 2, 3, and 12-16 of the Periodic Table. Preferred embodiments include those where c=1, those where c=2, and those where c=3. Preferred embodiments include those where $a \leq 1$ and c=1, those where a=2 and c=1, and those where $a \geq 3$ and c=3. Preferred embodiments for compounds having the formula $A^1_a M^1_b (XY_4)_c Z_d$ also include those having a structure similar to the mineral olivine (herein "olivines"), and those having a structure similar to NASICON (NA Super Ionic CONductor) materials (herein "NASICONs"). In another preferred embodiment, $M^1$ comprises MO, a +2 ion containing a +4 oxidation state transition metal.

In preferred embodiment, $M^2$ comprises at least one transition metal from Groups 4 to 11 of the Periodic Table, and at least one element from Groups 2, 3, and 12-16 of the Periodic Table. In another preferred embodiment $M^2$ is $M^4_k M^5_m M^6_n$, wherein $M^4$ is a transition metal selected from the group consisting of Fe, Co, Ni, Cu, V, Zr, Ti, Cr, Mo and mixtures thereof; $M^5$ is one or more transition metal from Groups 4 to 11 of the Periodic Table; $M^6$ is at least one metal selected from Group 2, 12, 13, or 14 of the Periodic Table; and k+m+n=f. Preferred embodiments of compounds having the formula $A^2_e M^2_f O_g$ include alkali metal transition metal oxide and more specifically lithium cobalt oxide, lithium nickel oxide, lithium nickel cobalt oxide, lithium nickel cobalt metal oxide and lithium copper oxide. In another preferred embodiment $A^3_h Mn_i O_4$ has an inner and an outer region, wherein the inner region comprises a cubic spinel manganese oxide, and the outer region comprises a manganese oxide that is enriched in $Mn^{+4}$ relative to the inner region.

In another embodiment, active materials comprise two or more groups of particles having differing chemical compositions, wherein (a) the first group of particles comprises a material of the formula $A^1_a M^1_b (XY_4)_c Z_d$; and
(b) the second group of particles comprises a material selected from materials of the formula $A^1_a M^1_b (XY_4)_c Z_d$; materials of the formula $A^2_e M^3_f O_g$; and mixtures thereof wherein
(i) $A^1$ and $A^2$ are independently selected from the group consisting of Li, Na, K, and mixtures thereof, and $0 < a \leq 8$, and $0 < e \leq 6$;
(ii) $M^1$ and $M^3$ are, independently, one or more metals, comprising at least one metal which is capable of undergoing oxidation to a higher valence state, and $0.8 \leq b \leq 3$, and $1 \leq f \leq 6$;
(iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0 \leq x < 3$; and $0 < y < 2$; and $0 < c \leq 3$;
(iv) Z is OH, halogen, or mixtures thereof and $0 \leq d \leq 6$;
(v) $0 < g \leq 15$; and (vi) wherein $M^1$, $M^3$, X, Y, Z, a, b, c, d, e, f, g, x and y are selected so as to maintain electroneutrality of said compound.

In a preferred embodiment, $M^1$ comprises at least one element from Groups 4 to 11 of the Periodic Table, and at least one element from Groups 2, 3, and 12-16 of the Periodic Table. In another preferred embodiment, $M^1$ comprises MO, a +2 ion containing a +4 oxidation state metal. In another preferred embodiment, $M^3$ is $M^4_k M^5_m M^6_n$, wherein $M^4$ is a transition metal selected from the group consisting of Fe, Co, Ni, Cu, V, Zr, Ti, Cr, Mo and mixtures thereof; $M^5$ is one or more transition metal from Groups 4 to 11 of the Periodic Table; $M^6$ is at least one metal selected from Group 2, 12, 13, or 14 of the Periodic Table. In another preferred embodiment $A^2_e M^3_f O_g$ comprises a material of the formula $A^3_h Mn_f O_4$ having an inner and an outer region, wherein the inner region comprises a cubic spinel manganese oxide, and the outer region comprises a cubic spinel manganese oxide that is enriched in $Mn^{+4}$ relative to the inner region. In another preferred embodiment, the mixture further comprises a basic compound.

In another embodiment, an active material of this invention comprises two or more groups of particles having differing chemical compositions, wherein
(a) the first group of particles comprises an inner and an outer region, wherein the inner region comprises a cubic spinel manganese oxide, and the outer region comprises a manganese oxide that is enriched in $Mn^{+4}$ relative to the inner region; and
(b) the second group of particles comprises a material selected from materials of the formula $A^1_a M^1_b (XY_4)_c Z_d$; materials of the formula $A^2_e M^3_f O_g$; and mixtures thereof;

wherein
(i) $A^1$ and $A^2$ are independently selected from the group consisting of Li, Na, K, and mixtures thereof, and $0<a\leq 8$, $0<e\leq 6$;
(ii) $M^1$ and $M^3$ are, independently, one or more metals, comprising at least one metal which is capable of undergoing oxidation to a higher valence state, and $0.8\leq b\leq 3$, and $1\leq f\leq 6$;
(iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0\leq x<3$; and $0<y<2$; and $0<c\leq 3$;
(iv) Z is OH, halogen, or mixtures thereof, and $0\leq d\leq 6$;
(v) $0<g\leq 15$; and
(vi) wherein $M^1$, $M^3$, X, Y, Z, a, b, c, d, e, f, g, x and y are selected so as to maintain electroneutrality of said compound.

In another embodiment the active material blend comprises two or more groups of particles having differing chemical compositions, wherein each group of particles comprises a material selected from:
(a) materials of the formula $A^1_a M^1_b (XY_4)_c Z_d$; and
(b) materials of the formula $LiMn_2O_4$ or $Li_{1+z}Mn_{2-z}O_4$;

wherein
(i) $A^1$ is selected from the group consisting of Li, Na, K, and mixtures thereof, and $0<a\leq 8$;
(ii) $M^1$ is one or more metals, comprising at least one metal which is capable of undergoing oxidation to a higher valence state, and $0.8\leq b\leq 3$;
(iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is halogen; $0\leq x<3$; and $0<y<2$; and $0<c\leq 3$;
(v) Z is OH, halogen, or mixtures thereof, and $0\leq d\leq 6$; and
(vi) $M^1$, X, Y, Z, a, b, c, d, x, y and z are selected so as to maintain electroneutrality of said compound.

Additional particles can be further added to the "binary" mixtures of two particles, to form mixtures having three or more particles having differing compositions. The particles can include additional active materials as well as compounds selected from a group of basic compounds. Such blends can be formed by combining three, four, five, six, etc. compounds together to provide various cathode active material blends.

In particular, in another embodiment, a terniary blend of active materials includes three groups of particles having differing chemical compositions, wherein each group of particles comprises a material selected from
(a) materials of the formula $A^1_a M^1_b (XY_4)_c Z_d$; and
(b) materials of the formula $A^2_e M^3_f O_g$; and mixtures thereof; wherein
(i) $A^1$ and $A^2$ are independently selected from the group consisting of Li, Na, K, and mixtures thereof, and $0<a\leq 8$, and $0<e\leq 6$;
(ii) $M^1$ and $M^3$ independently comprise one or more metals, comprising at least one metal which is capable of undergoing oxidation to a higher valence state, and $0.8\leq b\leq 3$, and $1\leq f\leq 6$;
(iii) $XY_4$ is selected from the group consisting of $X'O_{4-x}Y'_x$, $X'O_{4-y}Y'_{2y}$, $X''S_4$, and mixtures thereof where X' is selected from the group consisting of P, As, Sb, Si, Ge, V, S, and mixtures thereof; X" is selected from the group consisting of P, As, Sb, Si, Ge, V, and mixtures thereof; Y' is halogen; $0\leq x<3$; and $0<y<2$; and $0<c\leq 3$;
(iv) Z is OH, halogen, or mixtures thereof, and $0\leq d\leq 6$;
(v) $0<g\leq 15$; and
(vi) wherein $M^1$, $M^3$, X, Y, Z, a, b, c, d, e, f, g, x and y are selected so as to maintain electroneutrality of said compound.

This invention also provides electrodes comprising an electrode active material of this invention. Also provided are batteries that comprise a first electrode having an electrode active material of this invention; a second electrode having a compatible active material; and an electrolyte. In a preferred embodiment, the novel electrode material of this invention is used as a positive electrode (cathode) active material, reversibly cycling lithium ions with a compatible negative electrode (anode) active material.

It has been found that the novel electrode materials, electrodes, and batteries of this invention afford benefits over such materials and devices among those known in the art. In particular, it has been found that mixtures of active materials among those of this invention compensate and augment characteristics exhibited by component active materials during battery cycling. Such characteristics include enhanced cycling capacity, increased capacity retention of the cell, improved operating temperature characteristics, and improved voltage profiles. Thus, batteries may be designed having performance characteristics that are optimized for given desired end-use applications, having reduced cost, improved safety, and reduced environmental concerns associated with battery manufacturing and performance. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

Further areas of applicability of the present invention will become apparent from the detailed description provided hereinafter. It should be understood that the detailed description and specific examples, while indicating specific embodiments of the invention, are intended for purposes of illustration only and are not intended to limit the scope of the invention.

DETAILED DESCRIPTION OF THE INVENTION

The present invention provides electrode active materials for use in a battery. The present invention further provides batteries comprising mixtures of electrode active materials and electrolytes. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

The electrode active materials of this invention may be used in the anode, the cathode, or both. Preferably, the active materials of this invention are used in the cathode. As used herein, the terms "cathode" and "anode" refer to the electrodes at which oxidation and reduction occur, respectively, during battery discharge. During charging of the battery, the sites of oxidation and reduction are reversed. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

Electrode Active Materials:

The present invention provides mixtures or blends of electrochemically active materials (herein "electrode active materials"). The term "blend" or "mixture" refers to a combination of two or more individual active materials in a physical mixture. Preferably, each individual active material in a blend retains its individual chemical composition after mixing under normal operating conditions, except such variation as may occur during substantially reversible cycling of the battery in which the material is used. Such mixtures comprise discrete regions, or "particles," each comprising an active material with a given chemical composition, preferably a single active material. Preferably, the materials of this invention comprise a substantially homogenous distribution of particles.

The electrode active materials of the present invention comprise active materials of the general formulas $A_aM_b(XY_4)_cZ_d$ and $A_eM_fO_g$.

I. $A_aM_b(XY_4)_cZ_d$ Active Materials:

In one embodiment of this invention, active materials include compounds having the formula $A^1{}_aM^1{}_b(XY_4)_cZ_d$. Such electrode active materials of the formula $A^1{}_aM^1{}_b(XY_4)_c Z_d$ include lithium or other alkali metals, a transition metal, a phosphate or similar moiety, and a halogen or hydroxyl moiety. (As used herein, the word "include," and its variants, is intended to be non-limiting, such that recitation of items in a list is not to the exclusion of other like items that may also be useful in the materials, compositions, devices, and methods of this invention.)

$A^1$ is selected from the group consisting of Li (lithium), Na (sodium), K (potassium), and mixtures thereof. In a preferred embodiment, A is Li, or a mixture of Li with Na, a mixture of Li with K, or a mixture of Li, Na and K. In another preferred embodiment, $A^1$ is Na, or a mixture of Na with K. Preferably "a" is from about 0.1 to about 8, more preferably from about 0.2 to about 6. Where c=1, a is preferably from about 0.1 to about 3, preferably from about 0.2 to about 2. In a preferred embodiment, where c=1, a is less than about 1. In another preferred embodiment, where c=1, a is about 2. Where c=2, a is preferably from about 0.1 to about 6, preferably from about 1 to about 6. Where c=3, a is preferably from about 0.1 to about 6, preferably from about 2 to about 6, preferably from about 3 to about 6. In another embodiment, "a" is preferably from about 0.2 to about 1.0.

In a preferred embodiment, removal of alkali metal from the electrode active material is accompanied by a change in oxidation state of at least one of the metals comprising $M^1$. The amount of said metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A^1{}_aM^1{}_b(XY_4)_cZ_d$, the amount (a') of alkali metal that can be removed, as a function of the quantity (b') and valency ($V^{M^1}$) of oxidizable metal, is $$a'=b'(\Delta V^{M^1}),$$

where $\Delta V^{M^1}$ is the difference between the valence state of the metal in the active material and a valence state readily available for the metal. (The term oxidation state and valence state are used in the art interchangeably.) For example, for an active material comprising iron (Fe) in the +2 oxidation state, $\Delta V^{M^1}=1$, wherein iron may be oxidized to the +3 oxidation state (although iron may also be oxidized to a +4 oxidation state in some circumstances). If b=2 (two atomic units of Fe per atomic unit of material), the maximum amount (a') of alkali metal (oxidation state +1) that can be removed during cycling of the battery is 2 (two atomic units of alkali metal). If the active material comprises manganese (Mn) in the +2 oxidation state, $\Delta V^{M^1}=2$, wherein manganese may be oxidized to the +4 oxidation state (although Mn may also be oxidized to higher oxidation states in some circumstances). Thus, in this example, the maximum amount (a') of alkali metal that can be removed from a formula unit of active material during cycling of the battery is 4 atomic units, assuming that a≧4.

In general, the value of "a" in the active materials can vary over a wide range. In a preferred embodiment, active materials are synthesized for use in preparing a lithium ion battery in a discharged state. Such active materials are characterized by a relatively high value of "a", with a correspondingly low oxidation state of $M^1$ of the active material. As the battery is charged from its initial uncharged state, an amount a' of lithium is removed from the active material as described above. The resulting structure, containing less lithium (i.e., a–a') than in the as-prepared state as well as the transition metal in a higher oxidation state than in the as-prepared state, is characterized by lower values of a, while essentially maintaining the original value of b. The active materials of this invention include such materials in their nascent state (i.e., as manufactured prior to inclusion in an electrode) and materials formed during operation of the battery (i.e., by insertion or removal of Li or other alkali metal).

The value of "b" and the total valence of $M^1$ in the active material must be such that the resulting active material is electrically neutral (i.e., the positive charges of all anionic species in the material balance the negative charges of all cationic species), as further discussed below. The net valence of $M^1$ ($V^{M^1}$) having a mixture of elements ($M_\alpha$, $M_\beta$ ... $M_\omega$) may be represented by the formula $$V^{M^1} = V^{M_\alpha}b_1 + V^{M_\beta}b_2 + \ldots V^{M_\omega}b_\omega,$$

where $b_1 + b_2 + \ldots b_\omega = 1$, and $V^{M_\alpha}$ is the oxidation state of $M_\alpha$, $V^{M_\beta}$ is the oxidation state of $M_\beta$, etc. (The net valence of M and other components of the electrode active material is discussed further, below.)

$M^1$ is one or more metals including at least one metal that is capable of undergoing oxidation to a higher valence state (e.g., $Co^{+2} \rightarrow Co^{+3}$), preferably a transition metal selected from Groups 4-11 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals useful here include Fe, Co, Mn, Cu, V, Ni, Cr, and mixtures thereof. In some embodiments, mixtures of transition metals are preferred. Although, a variety of oxidation states for such transition metals are available, in some embodiments it is preferred that the transition metals have a +2 oxidation state.

$M^1$ may also comprise non-transition metals and metalloids. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

In a preferred embodiment, $M^1$ comprises one or more transition metals from Groups 4 to 11. In another preferred embodiment, $M^1$ comprises at least one transition metal from Groups 4 to 11 of the Periodic Table; and at least one element from Groups 2, 3, and 12-16 of the Periodic Table. Preferably, $M^1$ comprises a transition metal selected from the group consisting of Fe, Co, Ni, Mn, Cu, V, Zr, Ti, Cr, Mo and mixtures thereof. More preferably, $M^1$ comprises a transition metal selected from the group consisting of Fe, Co, Mn, Ti, and mixtures thereof. In a preferred embodiment, $M^1$ comprises Fe. In another preferred embodiment, $M^1$ comprises Co or a mixture of Co and Fe. In another preferred embodiment, $M^1$ comprises Mn or a mixture of Mn and Fe. In another preferred embodiment $M^1$ comprises a mixture of Fe, Co, and Mn. Preferably, $M^1$ further comprises a non-transition metal selected from the group consisting of Mg, Ca, Zn, Sr, Pb, Cd, Sn, Ba, Be, Al, and mixtures thereof. More preferably, $M^1$ comprises a non-transition metal selected from the group consisting of Mg, Ca, Al, and mixtures thereof.

In another preferred embodiment, $M^1$ comprises MO, a +2 ion containing a +4 oxidation state metal. Preferably M is selected from the group consisting of V (Vanadium), Ta (Tantalum), Nb (Niobium), and Mo (Molybdenum). Preferably M is V.

As further discussed herein, "b" is selected so as to maintain electroneutrality of the electrode active material. In a preferred embodiment, where c=1, b is from about 1 to about 2, preferably about 1. In another preferred embodiment, where c=2, b is from about 2 to about 3, preferably about 2.

$XY_4$ is an anion, preferably selected from the group consisting of $X'O_{4-x}Y'_x$, $X'O_{4-y}Y'_{2y}$, $X''S_4$, and mixtures thereof, where X' is selected from the group consisting of P (phosphorus), As (arsenic), Sb (antimony), Si (silicon), Ge (germanium), V (vanadium), S (sulfur), and mixtures thereof; X" is selected from the group consisting of P, As, Sb, Si, Ge, V and mixtures thereof. $XY_4$ anions useful herein include phosphate, silicate, germinate, vanadate, arsenate, antimonite, sulfur analogs thereof, and mixtures thereof. In a preferred embodiment, X' and X", are, respectively, selected from the group consisting of P, Si, and mixtures thereof. In a particularly preferred embodiment, X' and X" are P.

Y' is selected from the group consisting of halogen, S, N, and mixtures thereof. Preferably Y' is F (fluorine). In a preferred embodiment 0<x<3; and 0<y<2, such that a portion of the oxygen (O) in the $XY_4$ moiety is substituted with halogen. In another preferred embodiment, x and y are 0. In a particularly preferred embodiment $XY_4$ is $X'O_4$, where X' is preferably P or Si, more preferably P. In another particularly preferred embodiment, $XY_4$ is $PO_{4-y}Y'_x$, where Y' is halogen and $0<x\leq1$. Preferably Y' is F (fluorine) and $0.01<x\leq0.2$.

In a preferred embodiment, $XY_4$ is $PO_4$ (a phosphate group) or a mixture of $PO_4$ with another $XY_4$ group (i.e., where X' is not P, Y' is not O, or both, as defined above). When part of the phosphate group is substituted, it is preferred that the substitute group be present in a minor amount relative to the phosphate. In a preferred embodiment, $XY_4$ comprises 80% or more phosphate and up to about 20% of one or more phosphate substitutes. Phosphate substitutes include, without limitation, silicate, sulfate, antimonate, germanate, arsenate, monofluoromonophosphate, difluoromonophosphate, sulfur analogs thereof, and combinations thereof. Preferably, $XY_4$ comprises a maximum of about 10% of a phosphate substitute or substitutes. In another preferred embodiment, $XY_4$ comprises a maximum of about 25% of a phosphate substitute or substitutes. (The percentages are based on mole percent.) Preferred $XY_4$ groups include those of the formula $(PO_4)_{1-z}$, $(B)_z$, where B represents an $XY_4$ group or combination of $XY_4$ groups other than phosphate, and $z \leq 0.5$. Preferably, $z \leq 0.8$, more preferably less than about $z \leq 0.2$, more preferably $z \leq 0.1$.

Z is OH, halogen, or mixtures thereof. In a preferred embodiment, Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. In one preferred embodiment, d=0. In another preferred embodiment, d>0, preferably from about 0.1 to about 6, more preferably from about 0.1 to about 4. In such embodiments, where c=1, d is preferably from about 0.1 to about 3, preferably from about 0.2 to about 2. In a preferred embodiment, where c=1, d is about 1. Where c=2, d is preferably from about 0.1 to about 6, preferably from about 1 to about 6. Where c=3, d is preferably from about 0.1 to about 6, preferably from about 2 to about 6, preferably from about 3 to about 6.

The composition of $M^1$, $XY_4$, Z, and the values of a, b, c, d, x and y, are selected so as to maintain electroneutrality of the electrode active material. As referred to herein "electroneutrality" is the state of the electrode active material wherein the sum of the positively charged species (e.g., A and M) in the material is equal to the sum of the negatively charged species (e.g., $XY_4$) in the material. Preferably, the $XY_4$ moieties are comprised to be, as a unit moiety, an anion having a charge of −2, −3, or −4, depending on the selection of X', X", Y', and x and y. When $XY_4$ is a mixture of groups such as the preferred phosphate/phosphate substitutes discussed above, the net charge on the $XY_4$ anion may take on non-integer values, depending on the charge and composition of the individual groups $XY_4$ in the mixture.

In general, the valence state of each component element of the electrode active material may be determined in reference to the composition and valence state of the other component elements of the material. By reference to the general formula $A^1_a M^1_b (XY_4)_c Z_d$, the electroneutrality of the material may be determined using the formula $$(V^A)a + (V^{M^1})b + (V^X)c = (V^Y)4c + (V^Z)d$$

where $V^A$ is the net valence of $A^1$, $V^{M^1}$ is the net valence of $M^1$, $V^Y$ is the net valence of Y, and $V^Z$ is the net valence of Z. As referred to herein, the "net valence" of a component is (a) the valence state for a component having a single element which occurs in the active material in a single valence state; or (b) the mole-weighted sum of the valence states of all elements in a component comprising more than one element, or comprising a single element having more than one valence state. The net valence of each component is represented in the following formula.

$$(V^A)b = [(Va^{A1})a^1 + (Va^{A2})a^2 + \ldots (Va^{An})a^n]/n;\ a^1 + a^2 + \ldots a^n = a$$

$$(V^{M^1})b = [(V^{M\alpha})b^1 + (V^{M\beta})b^2 + \ldots (V^{M\omega})b^n]/n;\ b^1 + b^2 + \ldots b^n = b$$

$$(V^X)c = [(V^{X1})c^1 + (V^{X2})c^2 + \ldots (V^{Xn})c^n]/n;\ c^1 + c^2 + \ldots c^n = c$$

$$(V^Y)c = [(V^{Y1})c^1 + (V^{Y2})c^2 + \ldots (V^{Yn})c^n]/n;\ c^1 + c^2 + \ldots c^n = c$$

$$(V^Z)d = [(V^{Z1})d^1 + (V^{Z2})d^2 + \ldots (V^{Zn})d^n]/n;\ d^1 + d^2 + \ldots d^n = d$$

In general, the quantity and composition of $M^1$ is selected given the valency of X, the value of "c," and the amount of A, so long as $M^1$ comprises at least one metal that is capable of oxidation. The calculation for the valence of $M^1$ can be simplified, where $V^A=1$, $V^Z=1$, as follows.

For compounds where c=1: $(V^{M^1})b = (V^A)4 + d - a - (V^X)$

For compounds where c=3: $(V^{M^1})b = (V^A)12 + d - a - (V^X)3$

The values of a, b, c, d, x, and y may result in stoichiometric or non-stoichiometric formulas for the electrode active materials. In a preferred embodiment, the values of a, b, c, d, x, and y are all integer values, resulting in a stoichiometric formula. In another preferred embodiment, one or more of a, b, c, d, x and y may have non-integer values. It is understood, however, in embodiments having a lattice structure comprising multiple units of a non-stoichiometric formula $A^1_a M^1_b (XY_4)_c Z_d$, that the formula may be stoichiometric when looking at a multiple of the unit. That is, for a unit formula where one or more of a, b, c, d, x, or y is a non-integer, the values of each variable become an integer value with respect to a number of units that is the least common multiplier of each of a, b, c, d, x and y. For example, the active material $Li_2Fe_{0.5}Mg_{0.5}PO_4F$ is non-stoichiometric. However, in a material comprising two of such units in a lattice structure, the formula is $Li_4FeMg(PO_4)_2F_2$.

A preferred non-stoichiometric electrode active material is of the formula $Li_{1+d}M^1PO_4F_d$ where $0<d\leq 3$, preferably $0<d\leq 1$. Another preferred non-stoichiometric electrode active material is of the formula $Li_{1+d}M'M''PO_4F_d$; where $0<d<3$, preferably $0<d<1$.

Another preferred embodiment comprises a compound having an olivine structure. During charge and discharge of the battery, lithium ions are added to, and removed from, the active material preferably without substantial changes in the crystal structure of the material. Such materials have sites for the alkali metal (e.g., Li), the transition metal (M), and the $XY_4$ (e.g., phosphate) moiety. In some embodiments, all sites of the crystal structure are occupied. In other embodiments, some sites may be unoccupied, depending on, for example, the oxidation states of the metal (M).

A preferred electrode active material embodiment comprises a compound of the formula

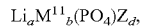

wherein
(i) $0.1 < a \leq 4$;
(ii) $M^{11}$ is one or more metals, comprising at least one metal which is capable of undergoing oxidation to a higher valence state, and $0.8 \leq b \leq 1.2$;
(iii) Z is halogen, and $0 \leq d \leq 4$; and
(iv) wherein $M^{11}$, Z, a, b, and d are selected so as to maintain electroneutrality of said compound.

wherein $M^{11}$, Z, a, b, and d are selected so as to maintain electroneutrality of said compound. Preferably, $0.2 < a \leq 1$.

In a preferred embodiment, $M^{11}$ comprises at least one element from Groups 4 to 11 of the Periodic Table, and at least one element from Groups 2, 3, and 12-16 of the Periodic Table. Preferably, $M^{11}$ is selected from the group consisting of Fe, Co, Mn, Cu, V, Cr, and mixtures thereof; and a metal selected from the group consisting of Mg, Ca, Zn, Ba, Al, and mixtures thereof. Preferably Z comprises F. Particularly preferred embodiments include those selected from the group consisting of $Li_2Fe_{0.9}Mg_{0.1}PO_4F$, $Li_2Fe_{0.8}Mg_{0.2}PO_4F$, $Li_2Fe_{0.95}Mg_{0.05}PO_4F$, $Li_2CoPO_4F$, $Li_2FePO_4F$, $Li_2MnPO_4F$, and mixtures thereof.

Another preferred embodiment comprises a compound of the formula

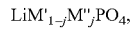

wherein M' is at least one transition metal from Groups 4 to 11 of the Periodic Table and has a +2 valence state; M" is at least one metallic element which is from Group 2, 12, or 14 of the Periodic Table and has a +2 valence state; and $0<j<1$. In a preferred embodiment compound $LiM'_{1-j}M''_jPO_4$ has an olivine structure and $0<j\leq 0.2$. Preferably M' is selected from the group consisting of Fe, Co, Mn, Cu, V, Cr, Ni, and mixtures thereof; more preferably M' is selected from Fe, Co, Ni, Mn and mixtures thereof. Preferably, M" is selected from the group consisting of Mg, Ca, Zn, Ba, and mixtures thereof. In a preferred embodiment M' is Fe and M" is Mg.

Another preferred embodiment comprises a compound of the formula:

$$LiFe_{1-q}M^{12}{}_qPO_4,$$

wherein $M^{12}$ is selected from the group consisting of Mg, Ca, Zn, Sr, Pb, Cd, Sn, Ba, Be, and mixtures thereof; and $0<q<1$. Preferably $0<q\leq 0.2$. In a preferred embodiment $M^{12}$ is selected from the group consisting of Mg, Ca, Zn, Ba, and mixtures thereof, more preferably, $M^{12}$ is Mg. In a preferred embodiment the compound comprises $LiFe_{1-q}Mg_qPO_4$, wherein $0<q\leq 0.5$. Particularly preferred embodiments include those selected from the group consisting of $LiFe_{0.8}Mg_{0.2}PO_4$, $LiFe_{0.9}Mg_{0.1}PO_4$, $LiFe_{0.95}Mg_{0.05}PO_4$, and mixtures thereof.

Another preferred embodiment comprises a compound of the formula $$Li_aCo_uFe_vM^{13}{}_wM^{14}{}_{aa}M^{15}{}_{bb}XY_4$$

wherein
(i) $0<a\leq 2$, $u>0$, and $v>0$;
(ii) $M^{13}$ is one or more transition metals, where $w\geq 0$;
(iii) $M^{14}$ is one or more +2 oxidation state non-transition metals, where $aa\geq 0$;
(iv) $M^{15}$ is one or more +3 oxidation state non-transition metals, where $bb\geq 0$;
(v) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is selected from the group consisting of halogen, S, N, and mixtures thereof; $0\leq x\leq 3$; and $0<y\leq 2$; and
wherein $(u+v+w+aa+bb)<2$, and $M^{13}$, $M^{14}$, $M^{15}$, $XY_4$, a, u, v, w, aa, bb, x, and y are selected so as to maintain electroneutrality of said compound. Preferably $0.8\leq(u+v+w+aa+bb)\leq 1.2$; wherein $u\geq 0.8$ and $0.05\leq v\leq 0.15$. More preferably, $u\geq 0.5$, $0.01\leq v\leq 0.5$, and $0.01\leq w\leq 0.5$.

In a preferred embodiment $M^{13}$ is selected from the group consisting of Ti, V, Cr, Mn, Ni, Cu and mixtures thereof. In another preferred embodiment $M^{13}$ is selected from the group consisting of Mn, Ti, and mixtures thereof. Preferably $0.01\leq(aa+bb)\leq 0.5$, more preferably $0.01\leq aa\leq 0.2$, even more preferably $0.01\leq aa\leq 0.1$. In another preferred embodiment, $M^{14}$ is selected from the group consisting of Be, Mg, Ca, Sr, Ba, and mixtures thereof. Preferably $M^{14}$ is Mg and $0.01\leq bb\leq 0.2$, even more preferably $0.01\leq bb \leq 0.1$. In another preferred embodiment $M^{15}$ is selected from the group consisting of B, Al, Ga, In, and mixtures thereof. Preferably $M^5$ is Al. In a preferred embodiment $XY_4$ is $PO_4$.

Another preferred embodiment comprises a compound of the formula:

$$LiM(PO_{4-x}Y'_x)$$

wherein M is $M^{16}{}_{cc}M^{17}{}_{dd}M^{18}{}_{ee}M^{19}{}_{ff}$, and
(i) $M^{16}$ is one or more transition metals;
(ii) $M^{17}$ is one or more +2 oxidation state non-transition metals;
(iii) $M^{18}$ is one or more +3 oxidation state non-transition metals;
(iv) $M^{19}$ is one or more +1 oxidation state non-transition metals;
(v) Y' is halogen; and $cc>0$, each of dd, ee, and $ff\geq 0$, $(cc+dd+ee+ff)\leq 1$, and $0\leq x\leq 0.2$. Preferably $cc\geq 0.8$. Preferably $0.01\leq(dd+ee)\leq 0.5$, more preferably $0.01\leq dd\leq 0.2$ and $0.01\leq ee\leq 0.2$. In another preferred embodiment $x=0$.

In a preferred embodiment $M^{16}$ is a +2 oxidation state transition metal selected from the group consisting of V, Cr, Mn, Fe, Co, Cu, and mixtures thereof. In another preferred embodiment, $M^{16}$ is selected from the group consisting of Fe, Co, and mixtures thereof. In a preferred embodiment $M^{17}$ is selected from the group consisting of Be, Mg, Ca, Sr, Ba and mixtures thereof. In a preferred embodiment $M^{18}$ is Al. In a preferred embodiment, $M^{19}$ is selected from the group consisting of Li, Na, and K, wherein $0.01\leq ff\leq 0.2$. In another preferred embodiment $M^{19}$ is Li. In another preferred embodiment, wherein $x=0$, $(cc+dd+ee+ff)=1$, $M^{17}$ is selected from the group consisting of Be, Mg, Ca, Sr, Ba and mixtures thereof preferably $0.01\leq dd\leq 0.1$, $M^{18}$ is Al, preferably $0.01\leq ee\leq 0.1$, and $M^{19}$ is Li, preferably $0.01\leq ff\leq 0.1$. In another preferred embodiment, $0<x\leq 0$, even more preferably $0.01\leq x\leq 0.05$, and $(cc+dd+ee+ff)<1$, wherein $cc\geq 0.8$, $0.01\leq dd\leq 0.1$, $0.01\leq ee\leq 0.1$ and $ff=0$. Preferably $(cc+dd+ee)=1-x$.

Another preferred embodiment comprises a compound of the formula:

$$A^1{}_a(MO)_bM'_{1-b}XO_4$$

(i) $A^1$ is independently selected from the group consisting of Li, Na, K and mixtures thereof, $0.1<a<2$;
(ii) M comprises at least one element, having a +4 oxidation state, capable of being oxidized to a higher oxidation state; $0<b\leq 1$;
(iii) M' is one or more metals selected from metals having a +2 and a +3 oxidation state; and
(iv) X is selected from the group consisting of P, As, Sb, Si, Ge, V, S, and mixtures thereof.

In a preferred embodiment, $A^1$ is Li. In another preferred embodiment, M is selected from a group consisting of +4 oxidation state transition metals. Preferably M is selected from the group comprising Vanadium (V), Tantalum (Ta), Niobium (Nb), molybdenum (Mo), and mixtures thereof. In a preferred embodiment M comprises V, $b=1$. M' may generally be any +2 or +3 element, or mixture of elements. In a preferred embodiment, M' is selected from the group consisting V, Cr, Mn, Fe, Co, Ni, Mo, Ti, Al, Ga, In, Sb, Bi, Sc, and mixtures thereof. More preferably M' is V, Cr, Mn, Fe, Co, Ni, Ti, Al, and mixtures thereof. In one embodiment, M' comprises Al. Particularly preferred embodiments include those selected from the group consisting of $LiVOPO_4$, $Li(VO)_{0.75}Mn_{0.25}PO_4$, $Li_{0.75}Na_{0.25}VOPO_4$, and mixtures thereof.

Another preferred embodiment comprises a compound of the formula:

$$A^1{}_aM^1{}_b(XY_4)_3Z_d,$$

wherein
(a) A is selected from the group consisting of Li, Na, K, and mixtures thereof, and $2\leq a\leq 8$;
(b) M comprises one or more metals, comprising at least one metal which is capable of undergoing oxidation to a higher valence state, and $1\leq b\leq 3$;
(c) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is selected from the group consisting of halogen, S, N, and mixtures thereof; $0 \leqq x<3$; and $0<y<2$; and (d) Z is OH, halogen, or mixtures thereof, and $0 \leqq d \leqq 6$; and wherein $M^1$, $XY_4$, Z, a, b, d, x and y are selected so as to maintain electroneutrality of said compound.

In a preferred embodiment, A comprises Li, or mixtures of Li with Na or K. In another preferred embodiment, A comprises Na, K, or mixtures thereof. In a preferred embodiment, $M^1$ comprises two or more transition metals from Groups 4 to 11 of the Periodic Table, preferably transition metals selected from the group consisting of Fe, Co, Ni, Mn, Cu, V, Zr, Ti, Cr, and mixtures thereof. In another preferred embodiment, $M^1$ comprises $M'_{1-m}M''_m$, where M' is at least one transition metal from Groups 4 to 11 of the Periodic Table; and M" is at least one element from Groups 2, 3, and 12-16 of the Periodic Table; and $0<m<1$. Preferably, M' is selected from the group consisting of Fe, Co, Ni, Mn, Cu, V, Zr, Ti, Cr, and mixtures thereof; more preferably M' is selected from the group consisting of Fe, Co, Mn, Cu, V, Cr, and mixtures thereof. Preferably, M" is selected from the group consisting of Mg, Ca, Zn, Sr, Pb, Cd, Sn, Ba, Be, Al, and mixtures thereof; more preferably, M" is selected from the group consisting of Mg, Ca, Zn, Ba, Al, and mixtures thereof. In a preferred embodiment, $XY_4$ is $PO_4$. In another preferred embodiment, X' comprises As, Sb, Si, Ge, S, and mixtures thereof; X" comprises As, Sb, Si, Ge and mixtures thereof; and $0<x<3$. In a preferred embodiment, Z comprises F, or mixtures of F with Cl, Br, OH, or mixtures thereof. In another preferred embodiment, Z comprises OH, or mixtures thereof with Cl or Br.

Non-limiting examples of active materials of the invention include the following: $Li_{0.95}Co_{0.8}Fe_{0.15}Al_{0.05}PO_4$, $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.45}Fe_{0.45}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $Li_{1.025}Co_{0.75}Fe_{0.15}Al_{0.025}Mg_{0.05}PO_4$, $Li_{1.025}Co_{0.85}Fe_{0.05}Al_{0.025}Mg_{0.05}PO_4$, $Li_{1.025}Co_{0.7}Fe_{0.08}Mn_{0.12}Al_{0.025}Mg_{0.05}PO_4$, $LiCo_{0.75}Fe_{0.15}Al_{0.025}Ca_{0.05}PO_{3.975}F_{0.025}$, $LiCo_{0.80}Fe_{0.10}Al_{0.025}Ca_{0.05}PO_{3.975}F_{0.025}$, $Li_{1.25}Co_{0.6}Fe_{0.1}Mn_{0.075}Mg_{0.025}Al_{0.05}PO_4$, $Li_{1.0}Na_{0.25}Co_{0.6}Fe_{0.1}Cu_{0.075}Mg_{0.025}Al_{0.05}PO_4$, $Li_{1.025}Co_{0.8}Fe_{0.1}Al_{0.025}Mg_{0.075}PO_4$, $Li_{1.025}Co_{0.6}Fe_{0.05}Al_{0.12}Mg_{0.0325}PO_{3.75}F_{0.25}$, $Li_{1.025}Co_{0.7}Fe_{0.1}Mg_{0.0025}Al_{0.04}PO_{3.75}F_{0.25}$, $Li_{0.75}Co_{0.5}Fe_{0.05}Mg_{0.015}Al_{0.04}PO_3F$, $Li_{0.75}Co_{0.5}Fe_{0.025}Cu_{0.025}Be_{0.015}Al_{0.04}PO_3F$, $Li_{0.75}Co_{0.5}Fe_{0.025}Mn_{0.025}Ca_{0.015}Al_{0.04}PO_3F$, $Li_{1.025}Co_{0.6}Fe_{0.05}B_{0.12}Ca_{0.0325}PO_{3.75}F_{0.25}$, $Li_{1.025}Co_{0.65}Fe_{0.05}Mg_{0.0125}Al_{0.1}PO_{3.75}F_{0.25}$, $Li_{1.025}Co_{0.65}Fe_{0.05}Mg_{0.065}Al_{0.14}PO_{3.975}F_{0.025}$, $Li_{1.075}Co_{0.8}Fe_{0.05}Mg_{0.025}Al_{0.05}PO_{3.975}F_{0.025}$, $LiCo_{0.08}Fe_{0.1}Al_{0.025}Mg_{0.05}PO_{3.975}F_{0.025}$, $Li_{0.25}Fe_{0.7}Al_{0.45}PO_4$, $LiMnAl_{0.067}(PO_4)_{0.8}(SiO_4)_{0.2}$, $Li_{0.95}Co_{0.9}Al_{0.05}Mg_{0.05}PO_4$, $Li_{0.95}Fe_{0.8}Ca_{0.15}Al_{0.05}PO_4$, $Li_{0.25}MnBe_{0.425}Ga_{0.3}SiO_4$, $Li_{0.5}Na_{0.25}Mn_{0.6}Ca_{0.375}Al_{0.1}PO_4$, $Li_{0.25}Al_{0.25}Mg_{0.25}Co_{0.75}PO_4$, $Na_{0.55}B_{0.15}Ni_{0.75}Ba_{0.25}PO_4$, $Li_{1.025}Co_{0.9}Al_{0.025}Mg_{0.05}PO_4$, $K_{1.025}Ni_{0.09}Al_{0.025}Ca_{0.05}PO_4$, $Li_{0.95}Co_{0.9}Al_{0.05}Mg_{0.05}PO_4$, $Li_{0.95}Fe_{0.8}Ca_{0.15}Al_{0.05}PO4$, $Li_{1.025}Co_{0.7}(Fe_{0.4}Mn_{0.6})_{0.2}Al_{0.025}Mg_{0.05}PO_4$, $Li_{1.025}Co_{0.8}Fe_{0.1}Al_{0.025}Mg_{0.05}PO_4$, $Li_{1.025}Co_{0.9}Al_{0.025}Mg_{0.05}PO_4$, $Li_{1.025}Co_{0.75}Fe_{0.15}Al_{0.025}Mg_{0.025}PO_4$, $LiCo_{0.75}Fe_{0.15}Al_{0.025}Ca_{0.05}PO_{3.975}F_{0.025}$, $LiCo_{0.9}Al_{0.025}Mg_{0.05}PO_{3.975}F_{0.025}$, $Li_{0.75}Co_{0.625}Al_{0.025}PO_{3.75}F_{0.25}$, $Li_{1.075}Co_{0.8}Cu_{0.05}Mg_{0.025}Al_{0.05}PO_{3.975}F_{0.025}$, $Li_{1.075}Fe_{0.8}Mg_{0.075}Al_{0.05}PO_{3.975}F_{0.025}$, $Li_{1.075}Co_{0.8}Mg_{0.075}Al_{0.05}PO_{3.975}F_{0.025}$, $Li_{1.025}Co_{0.8}Mg_{0.1}Al_{0.05}PO_{3.975}F_{0.025}$, $LiCo_{0.7}Fe_{0.2}Al_{0.025}Mg_{0.05}PO_{3.975}F_{0.025}$, $Li_2Fe_{0.8}Mg_{0.2}PO_4F$; $Li_2Fe_{0.5}Co_{0.5}PO_4F$; $Li_3CoPO_4F_2$; $KFe(PO_3F)F$; $Li_2Co(PO_3F)Br_2$; $Li_2Fe(PO_3F_2)F$; $Li_2FePO_4Cl$; $Li_2MnPO_4OH$; $Li_2CoPO_4F$; $Li_2Fe_{0.5}Co_{0.5}PO_4F$; $Li_2Fe_{0.9}Mg_{0.1}PO_4F$; $Li_2Fe_{0.8}Mg_{0.2}PO_4F$; $Li_{1.25}Fe_{0.9}Mg_{0.1}PO_4F_{0.25}$; $Li_2MnPO_4F$; $Li_2CoPO_4F$; $K_2Fe_{0.9}Mg_{0.1}P_{0.5}As_{0.5}O_4F$; $Li_2MnSbO_4OH$; $Li_2Fe_{0.6}Co_{0.4}SbO_4Br$; $Na_3CoAsO_4F_2$; $LiFe(AsO_3F)Cl$; $Li_2Co(As_{0.5}Sb_{0.5}O_3F)F_2$; $K_2Fe(AsO_3F_2)F$; $Li_2NiSbO_4F$; $Li_2FeAsO_4OH$; $Li_4Mn_2(PO_4)_3F$; $Na_4FeMn(PO_4)_3OH$; $Li_4FeV(PO_4)_3Br$; $Li_3VAl(PO_4)_3F$; $K_3VAl(PO_4)_3Cl$; $LiKNaTiFe(PO_4)_3F$; $Li_4Ti_2(PO_4)_3Br$; $Li_3V_2(PO_4)_3F_2$; $Li_6FeMg(PO_4)_3OH$; $Li_4Mn_2(AsO_4)_3F$; $K_4FeMn(AsO_4)_3OH$; $Li_4FeV(P_{0.5}Sb_{0.5}O_4)_3Br$; $LiNaKAlV(AsO_4)_3F$; $K_3VAl(SbO_4)_3Cl$; $Li_3TiV(SbO_4)_3F$; $Li_2FeMn(P_{0.5}As_{0.5}O_3F)_3$; $Li_4Ti_2(PO_4)_3F$; $Li_{3.25}V_2(PO_4)_3F_{0.25}$; $Li_3Na_{0.75}Fe_2(PO_4)_3F_{0.75}$; $Na_{6.5}Fe_2(PO_4)_3(OH)Cl_{0.5}$; $K_8Ti_2(PO_4)_3F_3Br_2$; $K_8Ti_2(PO_4)_3F_5$; $Li_4Ti_2(PO_4)_3F$; $LiNa_{1.25}V_2(PO_4)_3F_{0.5}Cl_{0.75}$; $K_{3.25}Mn_2(PO_4)_3OH_{0.25}$; $LiNa_{1.25}KTiV(PO_4)_3(OH)_{1.25}Cl$; $Na_8Ti_2(PO_4)_3F_3Cl_2$; $Li_7Fe_2(PO_4)_3F_2$; $Li_8FeMg(PO_4)_3F_{2.25}Cl_{0.75}$; $Li_5Na_{2.5}TiMn(PO_4)_3(OH)_2Cl_{0.5}$; $Na_3K_{4.5}MnCa(PO_4)_3(OH)_{1.5}Br$; $K_9FeBa(PO_4)_3F_2Cl_2$; $Li_7Ti_2(SiO_4)_2(PO_4)F_2$; $Na_8Mn_2(SiO_4)_2(PO_4)F_2Cl$; $Li_3K_2V_2(SiO_4)_2(PO_4)(OH)Cl$; $Li_4Ti_2(SiO_4)_2(PO_4)(OH)$; $Li_2NaKV_2(SiO_4)_2(PO_4)F$; $Li_5TiFe(PO_4)_3F$; $Na_4K_2VMg(PO_4)_3FCl$; $Li_4NaAlNi(PO_4)_3(OH)$; $Li_4K_3FeMg(PO_4)_3F_2$; $Li_2Na_2K_2CrMn(PO_4)_3(OH)Br$; $Li_5TiCa(PO_4)_3F$; $Li_4Ti_{0.75}Fe_{1.5}(PO_4)_3F$; $Li_3NaSnFe(PO_4)_3(OH)$; $Li_3NaGe_{0.5}Ni_2(PO_4)_3(OH)$; $Na_3K_2VCo(PO_4)_3(OH)Cl$; $Li_4Na_2MnCa(PO_4)_3F(OH)$; $Li_3NaKTiFe(PO_4)_3F$; $Li_7FeCo(SiO_4)_2(PO_4)F$; $Li_3Na_3TiV(SiO_4)_2(PO_4)F$; $K_{5.5}CrMn(SiO_4)_2(PO_4)Cl_{0.5}$; $Li_3Na_{2.5}V_2(SiO_4)_2(PO_4)(OH)_{0.5}$; $Na_{5.25}FeMn(SiO_4)_2(PO_4)Br_{0.25}$; $Li_{6.5}VCo(SiO_4)_{2.5}(PO_4)_{0.5}F$; $Na_{7.25}V_2(SiO_4)_{2.25}(PO_4)_{0.75}F_2$; $Li_4NaVTi(SiO_4)_3F_{0.5}Cl_{0.5}$; $Na_2K_{2.5}ZrV(SiO_4)_3F_{0.5}$; $Li_4K_2MnV(SiO_4)_3(OH)_2$; $Li_3Na_3KTi_2(SiO_4)_3F$; $K_6V_2(SiO_4)_3(OH)Br$; $Li_8FeMn(SiO_4)_3F_2$; $Na_3K_{4.5}MnNi(SiO_4)_3(OH)_{1.5}$; $Li_3Na_2K_2TiV(SiO_4)_3(OH)_{0.5}Cl_{0.5}$; $K_9VCr(SiO_4)_3F_2Cl$; $Li_4Na_4V_2(SiO_4)_3FBr$; $Li_4FeMg(SO_4)_3F_2$; $Na_2KNiCo(SO_4)_3(OH)$; $Na_5MnCa(SO_4)_3F_2Cl$ ; $Li_3NaCoBa(SO_4)_3FBr$; $Li_{2.5}K_{0.5}FeZn(SO_4)_3F$; $Li_3MgFe(SO_4)_3F_2$; $Li_2NaCaV(SO_4)_3 FCl$; $Na_4NiMn(SO_4)_3(OH)_2$; $Na_2 KBaFe(SO_4)_3F$; $Li_2KCuV(SO_4)_3(OH)Br$; $Li_{1.5}CoPO_4F_{0.5}$; $Li_{1.25}CoPO_4F_{0.25}$; $Li_{1.75}FePO_4F_{0.75}$; $Li_{1.66}MnPO_4F_{0.66}$; $Li_{1.5}Co_{0.75}Ca_{0.25}PO_4F_{0.5}$; $Li_{1.75}Co_{0.8}Mn_{0.2}PO_4F_{0.75}$; $Li_{1.25}Fe_{0.75}Mg_{0.25}PO_4F_{0.25}$; $Li_{1.66}Co_{0.6}Zn_{0.4}PO_4F_{0.66}$; $KMn_2SiO_4Cl$; $Li_2VSiO_4(OH)_2$; $Li_3CoGeO_4F$; $LiMnSO_4F$; $NaFe_{0.9}Mg_{0.1}SO_4Cl$; $LiFeSO_4F$; $LiMnSO_4OH$; $KMnSO_4F$; $Li_{1.75}Mn_{0.8}Mg_{0.2}PO_4F_{0.75}$; $Li_3FeZn(PO_4)F_2$; $Li_{0.5}V_{0.75}Mg_{0.5}(PO_4)F_{0.75}$; $Li_3V_{0.5}Al_{0.5}(PO_4)F_{3.5}$; $Li_{0.75}VCa(PO_4)F_{1.75}$; $Li_4CuBa(PO_4)F_4$; $Li_{0.5}V_{0.5}Ca(PO_4)(OH)_{1.5}$; $Li_{1.5}FeMg(PO_4)(OH)Cl$; $LiFeCoCa(PO_4)(OH)_3F$; $Li_3CoBa(PO_4)(OH)_2Br_2$; $Li_{0.75}Mn_{1.5}Al(PO_4)(OH)_{3.75}$; $Li_2Co_{0.75}Mg_{0.25}(PO_4)F$; $LiNaCo_{0.8}Mg_{0.2}(PO_4)F$; $NaKCo_{0.5}Mg_{0.5}(PO_4)F$; $LiNa_{0.5}K_{0.5}Fe_{0.75}Mg_{0.25}(PO_4)F$; $Li_{1.5}K_{0.5}V_{0.5}Zn_{0.5}(PO_4)F_2$; $Na_6Fe_2Mg(PS_4)_3(OH_2)Cl$; $Li_4Mn_{1.5}Co_{0.5}(PO_3F)_3(OH)_{3.5}$; $K_8FeMg(PO_3F)_3F_3Cl_3$ $Li_5Fe_2Mg(SO_4)_3Cl_5$; $LiTi_2(SO_4)_3Cl$, $LiMn_2(SO_4)_3F$, $Li_3Ni_2$ $(SO_4)_3Cl$, $Li_3Co_2(SO_4)_3F$, $Li_3Fe_2(SO_4)_3Br$, $Li_3Mn_2(SO_4)_3F$, $Li_3MnFe(SO_4)_3F$, $Li_3NiCo(SO_4)_3Cl$; $LiMnSO_4F$; $LiFeSO_4F$; $LiNiSO_4F$; $LiCoSO_4Cl$; $LiMn_{1-x}Fe_xSO_4F$, $LiFe_{1-x}Mg_xSO_4F$; $Li_7ZrMn(SiO_4)_3F$; $Li_7MnCo(SiO_4)_3F$; $Li_7MnNi(SiO_4)_3F$; $Li_7VAl(SiO_4)_3F$; $Li_5MnCo(PO_4)_2(SiO_4)F$; $Li_4VAl(PO_4)_2(SiO_4)F$; $Li_4MnV(PO_4)_2(SiO_4)F$; $Li_4VFe(PO_4)_2(SiO_4)F$; $Li_{0.6}VPO_4F_{0.6}$; $Li_{0.8}VPO_4F_{0.8}$; $LiVPO_4F$; $Li_3V_2(PO_4)_2F_3$; $LiVPO_4Cl$; $LiVPO_4OH$; $NaVPO_4F$; $Na_3V_2(PO_4)_2F_3$; $LiV_{0.9}Al_{0.1}PO_4F$; $LiFePO_4F$; $LiTiPO_4F$; $LiCrPO_4F$; $LiFePO_4$; $LiCoPO_4$, $LiMnPO_4$; $LiFe_{0.9}Mg_{0.1}PO_4$; $LiFe_{0.8}Mg_{0.2}PO_4$; $LiFe_{0.95}Mg_{0.05}PO_4$; $LiFe_{0.9}Ca_{0.1}PO_4$; $LiFe_{0.8}Ca_{0.2}PO_4$; $LiFe_{0.8}Zn_{0.2}PO_4$; $LiMn_{0.8}Fe_{0.2}PO4$; $LiMn_{0.9}Fe_{0.8}PO4$; $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$, $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO4)_3$; $Li_3TiCo(PO_4)_3$; $Li_3TiAl(PO_4)_3$; $Li_3TiNi(PO_4)_3$; $Li_3ZrMnSiP_2O_{12}$; $Li_3V_2SiP_2O_{12}$; $Li_3MnVSiP_2O_{12}$; $Li_3TiVSiP_2O_{12}$; $Li_3TiCrSiP_2O_{12}$; $Li_{3.5}AlVSi_{0.5}P_{2.5}O_{12}$; $Li_{3.5}V2SiO_{0.5}P_{2.5}O_{12}$; $Li_{2.5}AlCrSi_{0.5}P_{2.5}O_12$; $Li_{2.5}V_2P_3O_{11.5}F_{0.5}$; $Li_2V_2P_3O_{11}F$; $Li_{2.5}VMnP_3O_{11.5}F_{0.5}$; $Li_2V_{0.5}Fe_{1.5}P_3O_{11}F$; $Li_3V_{0.5}V_{1.5}P_3O_{11.5}F_{0.5}$; $Li_3V_2P_3O_{11}F$; $Li_3Mn_{0.5}V_{1.5}P_3O_{11}F_{0.5}$; $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Ti_{0.025}Al_{0.025}Mg_{0025}PO_4$, $Li_{1.025}Co_{0.8}Fe_{0.1}Ti_{0.025}Mg_{0.05}PO_4$, $Li_{1.025}Co_{0.8}Fe_{0.1}Ti_{0.025}Al_{0.025}Mg_{0.025}PO_4$, $LiCo_{0.8}Fe_{0.1}Ti_{0.05}Mg_{0.05}PO_4$, $LiVOPO_4$, $Li(VO)_{0.75}Mn_{0.25}PO_4$, $NaVOPO_4$, $Li_{0.75}Na_{0.25}VOPO_4$, $Li(VO)_{0.5}Al_{0.5}PO_4$, $Na(VO)_{0.75}Fe_{0.25}PO_4$, $Li_{0.5}Na_{0.5}VOPO_4$, $Li(VO)_{0.75}Co_{0.25}PO_4$, $Li(VO)_{0.75}Mo_{0.25}PO_4$, $LiVOSO_4$, and mixtures thereof.

Preferred active materials include $LiFePO_4$; $LiCoPO_4$, $LiMnPO_4$; $LiMn_{0.8}Fe_{0.2}PO_4$; $LiMn_{0.9}Fe_{0.8}PO_4$; $LiFe_{0.9}Mg_{0.1}PO_4$; $LiFe_{0.8}Mg_{0.2}PO_4$; $LiFe_{0.95}Mg_{0.05}PO_4$; $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO3.975F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiVOPO_4$; $Li(VO)_{0.75}Mn_{0.25}PO_4$; and mixtures thereof. A particularly preferred active material is $LiCo_{0.8}Fe_{0.1}Al_{0.025}Mg_{0.05}PO_{3.975}F_{0.025}$.

II. $A_eM_fO_g$ Active Materials:

In an embodiment of this invention, active materials of this invention comprise alkali metal transition metal oxides of the formula $A_eM_fO_g$. Such embodiments comprise compounds of the formula $A^2_eM^3_fO_g$.

$A^2$ is selected from the group consisting of Li (lithium), Na (sodium), K (potassium), and mixtures thereof. In a preferred embodiment, $A^2$ is Li, or a mixture of Li with Na, a mixture of Li with K, or a mixture of Li, Na and K. In another preferred embodiment, $A^2$ is Na, or a mixture of Na with K. Preferably "e" is from about 0.1 to about 6, more preferably from about 0.1 to about 3, and even more preferably from about 0.2 to about 2.

$M^3$ comprises one or more metals, comprising at least one metal which is capable of undergoing oxidation to a higher valence state. In a preferred embodiment, removal of alkali metal from the electrode active material is accompanied by a change in oxidation state of at least one of the metals comprising $M^3$. The amount of the metal that is available for oxidation in the electrode active material determined the amount of alkali metal that may be removed. Such concepts for oxide active materials are well known in the art, e.g., as disclosed in U.S. Pat. Nos. 4,302,518 and 4,357,215 issued to Goodenough et al; and U.S. Pat. No. 5,783,333, Mayer, issued Jul. 21, 1998, all of which are incorporated by reference herein.

Similar to the oxidation process described above for formula $A^1_aM^1_b(XY_4)_cZ_d$, the oxidation process for $A^2_eM^3_fO_g$ reflects the amount (e') of alkali metal that can be removed, as a function of the quantity (f') and valency ($V^{M^2}$) of oxidizable metal, is $$e'=f'(\Delta V^{M^3}),$$

where $\Delta V^{M^2}$ is the difference between the valence state of the metal in the active material and a valence state readily available for the metal.

The $O_g$ component of the compound provides the oxide and the negatively charged species in the material. Preferably $1 \leq g \leq 15$, more preferably $2 \leq g \leq 13$, and even more preferably $2 \leq g \leq 8$.

$M^3$ may comprise a single metal, or a combination of two or more metals. In embodiments where $M^3$ is a combination of elements, the total valence of $M^2$ in the active material must be such that the resulting active material is electrically neutral. $M^3$ may be, in general, a metal or metalloid, selected from the group consisting of elements from Group 2-14 of the Periodic Table.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series (the 4th Period of the Periodic Table), selected from the group consisting of Ti, V, Cr, Mn, Fe, Co, Ni, Cu, and mixtures thereof. Particularly preferred transition metals useful here include Fe, Co, Mn, Mo, Cu, V, Cr, and mixtures thereof. In some embodiments, mixtures of transition metals are preferred. Although, a variety of oxidation states for such transition metals are available, in some embodiments it is preferred that the transition metals have a +2 oxidation state.

$M^3$ may also comprise non-transition metals and metalloids. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

In a preferred embodiment, $M^3$ comprises one or more transition metals from Groups 4 to 11. In another preferred embodiment, $M^3$ comprises a mixtures of metals, wherein is at least one is a transition metal from Groups 4 to 11. In another preferred embodiment, $M^3$ comprises at least one metal selected from the group consisting of Fe, Co, Ni, V, Zr, Ti, Mo and Cr, preferably $1 \leq f \leq 6$. In another preferred embodiment $M^2$ is $M^4_k M^5_m M^6_n$, wherein k+m+n=f. In a preferred embodiment, $M^4$ is a transition metal selected from the group consisting of Fe, Co, Ni, Mo, Cu, V, Zr, Ti, Cr, Mo and mixtures thereof, more preferably $M^4$ is selected from the group consisting of Co, Ni, Mo, V, Ti, and mixtures thereof. In a preferred embodiment, $M^5$ is one or more transition metal from Groups 4 to 11 of the Periodic Table. In a preferred embodiment, $M^6$ is at least one metal selected from Group 2, 12, 13, or 14 of the Periodic Table, more preferably $M^6$ is selected from the group consisting of Mg, Ca, Al, and mixtures thereof, preferably n>0.

A preferred electrode active material embodiment comprises a compound of the formula $A^2_e M^2_f O_g$. In a preferred embodiment $A^2$ comprises Li. Preferably $M^2$ comprises one or more metals, wherein at least one metal is capable of undergoing oxidation to a higher valence state, and $1 \leq f \leq 6$. In another preferred embodiment $M^2$ is $M^4_k M^5_m M^6_n$, wherein k+m+n=f. In a preferred embodiment, $M^4$ is a transition metal selected from the group consisting of Fe, Co, Ni, Mo, V, Zr, Ti, Cr, and mixtures thereof, more preferably $M^4$ is selected from the group consisting of Co, Ni, Mo, V, Ti, and mixtures thereof. In a preferred embodiment, $M^5$ is one or more transition metal from Groups 4 to 11 of the Periodic Table. In a preferred embodiment, $M^6$ is at least one metal selected from Group 2, 12, 13, or 14 of the Periodic Table, more preferably $M^6$ is selected from the group consisting of Mg, Ca, Al, and mixtures thereof, preferably n>0.

A preferred electrode active material embodiment comprises a compound of the formula $$LiNi_r Co_s M^6_t O_2$$

wherein $0<(r+s) \leq 1$, and $0 \leq t<1$. In another preferred embodiment r=(1−s), where t=0. In another preferred embodiment r=(1−s−t), wherein t>0. $M^6$ is at least one metal selected from Group 2, 12, 13, or 14 of the Periodic Table, more preferably $M^6$ is selected from the group consisting of Mg, Ca, Al, and mixtures thereof.

Alkali/transition metal oxides among those useful herein include $LiMn_2O_4$, $LiNiO_2$, $LiCoO_2$, $LiNi_{0.75}Al_{0.25}O_2$, $Li_2CuO_2$, $\gamma$-$LiV_2O_5$, $LiCo_{0.5}Ni_{0.5}O_2$, $NaCoO_2$, $NaNiO_2$, $LiNiCoO_2$, $LiNi_{0.75}Co_{0.25}O_2$, $LiNi_{0.8}Co_{0.2}O_2$, $LiNi_{0.6}Co_{0.4}O_2$, $LiMnO_2$, $LiMoO_2$, $LiNi_{0.8}Co_{0.15}Al_{0.05}O_2$, $LiFeO_3$, $\alpha$-$LiFe_5O_8$, $\beta$-$LiFe_5O_8$, $Li_2Fe_3O_4$, $LiFe_2O_3$, $LiNi_{0.6}Co_{0.2}Al_{0.2}O_2$, $LiNi_{0.8}Co_{0.15}Mg_{0.05}O_2$, $LiNi_{0.8}Co_{0.15}Ca_{0.05}O_2$, $NaNi_{0.8}Co_{0.15}Al_{0.05}O_2$, $KNi_{0.8}Co_{0.15}Mg_{0.05}O_2$, $LiCr_{0.8}Co_{0.15}Al_{0.05}O_2$, $KCoO_2$, $Li_{0.5}Na_{0.5}CoO_2$, $NaNi_{0.6}Co_{0.4}O_2$, $KNi_{0.75}Co_{0.25}O_2$, $LiFe_{0.75}Co_{0.25}O_2$, $LiCu_{0.8}Co_{0.2}O_2$, $LiTi_{0.9}Ni_{0.1}O_2$, $LiV_{0.8}Co_{0.2}O2$, $Li_3V_2Co_{0.5}Al_{0.5}O_5$, $Na_2LiVNi_{0.5}Mg_{0.5}O_5$, $Li_5CrFe_{1.5}CaO_7$, $LiCrO_2$, $LiVO_2$, $LiTiO_2$, $NaVO_2$, $NaTiO_2$, $Li_2FeV_2O_5$, $Li_5Ni_{2.5}Co_3O_8$; $Li_6V_2Fe_{1.5}CaO_9$, and mixtures thereof. Preferred alkali/transition metal oxides include $LiNiO_2$, $LiCoO_2$, $LiNi_{1-x}Co_xO_2$, $\gamma$-$LiV_2O_5$, $Li_2CuO_2$ and mixtures thereof.

Another preferred embodiment of this invention comprises electrode active materials of the formula $A^3_h Mn_i O$ (herein "modified manganese oxide") having an inner and an outer region, wherein the inner region comprises a cubic spinel manganese oxide, and the outer region is enriched with $Mn^{+4}$ relative to the inner region.

In a preferred embodiment $A^3$ is selected from the group consisting of Li (lithium), Na (sodium), K (potassium), and mixtures thereof. In a preferred embodiment, $A^3$ is Li, or a mixture of Li with Na, a mixture of Li with K, or a mixture of Li, Na and K. In another preferred embodiment, $A^3$ is Na, or a mixture of Na with K. Preferably $h \leq 2.0$, more preferably $0.8 \leq h \leq 1.5$, and even more preferably $0.8 \leq h \leq 1.2$, and h and i are selected so as to maintain electroneutrality.

In a preferred embodiment, such modified manganese oxide active materials are characterized as particles having a core or bulk structure of cubic spinel manganese oxide and a surface region which is enriched in $Mn^{+4}$ relative to the bulk. X-ray diffraction data and x-ray photoelectron spectroscopy data are consistent with the structure of the stabilized manganese oxide being a central bulk of cubic spinel lithium manganese oxide with a surface layer or region comprising $A_2MnO_3$, where A is an alkali metal.

The mixture preferably contains less than 50% by weight of the alkali metal compound, preferably less than about 20%. The mixture contains at least about 0.1% by weight of the alkali metal compound, and preferably 1% by weight or more. In a preferred embodiment, the mixture contains from about 0.1% to about 20%, preferably from about 0.1% to about 10%, and more preferably from about 0.4% to about 6% by weight of the alkali metal compound.

The alkali metal compound is a compound of lithium, sodium, potassium, rubidium or cesium. The alkali metal compound serves as a source of alkali metal ion in particulate form. Preferred alkali metal compounds are sodium compounds and lithium compounds. Examples of compounds include, without limitation, carbonates, metal oxides, hydroxides, sulfates, aluminates, phosphates and silicates. Examples of lithium compounds thus include, without limitation, lithium carbonates, lithium metal oxides, lithium mixed metal oxides, lithium hydroxides, lithium aluminates, and lithium silicates, while analogous sodium compounds are also preferred. A preferred lithium compound is lithium carbonate. Sodium carbonate and sodium hydroxide are preferred sodium compounds. The modified manganese oxide is preferably characterized by reduced surface area and increased alkali metal content compared to an unmodified spinel lithium manganese oxide. In one alternative, essentially all of a lithium or sodium compound is decomposed or reacted with the lithium manganese oxide.

In one aspect, the decomposition product is a reaction product of the LMO particles and the alkali metal compound. For the case where the alkali metal is lithium, a lithium-rich spinel is prepared. A preferred electrode active material embodiment comprises a compound of the formula $Li_{1+p}Mn_{2-p}O_4$, where $0 \leq p<0.2$. Preferably p is greater than or equal to about 0.081.

In many embodiments, the modified manganese oxide material of the invention is red in color. Without being bound by theory, the red color may be due to a deposit or nucleation of $Li_2MnO_3$ (or $Na_2MnO_3$, which is also red in color) at the surface or at the grain boundaries. Without being bound by theory, one way to envision the formation of the "red" modified manganese oxide is as follows. $Mn^{+3}$ at the surface of a cubic spinel lithiated manganese oxide particle loses an electron to combine with added alkali metal from the alkali metal compound. Advantageously, the alkali metal compound is lithium carbonate. Thus, the cubic spine lithiated manganese oxide becomes enriched in lithium. Charge balance is maintained by combination with oxygen from the available atmosphere, air, during the solid state synthesis. The oxidation of $Mn^{+3}$ to $Mn^{+4}$ at the surface of the particle results in a loss of available capacity and a contraction of the unit cell. Thus a surface region of the particle relatively enhanced in $Mn^{+4}$ forms during the reaction of the cubic spinel lithiated manganese oxide with the lithium compound in air or in the presence of oxygen. At least in the early stages of the reaction, a surface layer or coating of $Li_2MnO_3$ is formed on the surface of the particle. It is believed that formation of the red colored $Li_2MnO_3$ (or $Na_2MnO_3$) at the surface of the particle is responsible for the red color observed in some samples of the treated LMO of the invention.

In a preferred embodiment of this invention, the blends additionally comprise a basic compound. Such a "basic compound" is any material that is capable of reacting with and neutralizing acid produced during operation of the cell, such as by decomposition of the electrolyte or other battery components as discussed below. A basic compound can be blended in combination with one or more cathode active material, such as those mentioned above, to provide enhanced performance.

Non-limiting examples of basic compounds include inorganic and organic bases. Examples of inorganic bases include, without limitation, carbonates, metal oxides, hydroxides, phosphates, hydrogen phosphates, dihydrogen phosphates, silicates, aluminates, borates, bicarbonates and mixtures thereof. Preferred basic compounds include the basic carbonates, basic metal oxides, basic hydroxides, and mixtures thereof. Examples include without limitation LiOH, $Li_2O$, $LiAlO_2$, $Li_2SiO_3$, $Li_2CO_3$, $Na_2CO_3$, and $CaCO_3$. Organic bases useful as the basic compound include basic amines and other organic bases such as carboxylic acid salts. Examples include without limitation primary, secondary and tertiary amines, and salts of organic acids such as acetic acid, propanoic acid, butyric acid and the like. Specific examples of amines include n-butylamine, tributylamine, and isopropylamine, as well as alkanolamines. Preferred organic bases include those having 6 carbon atoms or fewer.

In a preferred embodiment, the basic compound is provided in particulate form. In another preferred embodiment, the basic compound is a lithium compound. Lithium compounds are preferred because they are more compatible with other components of the cell which also provide sources of lithium ion. Most preferred lithium basic compounds include, but are not limited to LiOH, $Li_2O$, $LiAlO_2$, $Li_2SiO_3$, and $Li_2CO_3$.

III. Blends

Various blends of the above-mentioned compounds having the general formulas $A_aM_b(XY_4)_cZ_d$ and $A_eM_fO_g$ are preferred. The compounds are preferably mixed with one another to provide an electrode active material comprising mixed active particles. In embodiments comprising a first active material and a second active material, the weight ratio of first material:second material is from about 1:9 to about 9:1, preferably from about 2:8 to about 8:2. In some embodiments, the weight ratio is from about 3:7 to about 7:3. In some embodiments, the weight ratio is from about 4:6 to about 6:4, preferably about 5:5 (i.e., about 1:1).

As will be appreciated by one of skill in the art, varying the composition of the active material blend will affect operating conditions of the battery, such as discharge voltage and cycling characteristics. Thus, a specific blend of active materials can be selected for use within a battery depending on the composition and design of the battery and desired performance and operating parameters, such as electrolyte/solvent being used, temperature, voltage profile, etc.

One cathode active material blend is a powder that includes two groups of particles having differing chemical compositions, wherein each group of particles comprises a material selected from:

(a) materials of the formula $A^1_aM^1_b(XY_4)_cZ_d$;
(b) materials of the formula $A^2_eM^2_fO_g$; and
(c) materials of the formula $A^3_hMn_iO_4$;

wherein (i) $A^1$, $A^2$, and $A^3$ are independently selected from the group consisting of Li, Na, K, and mixtures thereof, and $0 < a \leq 8$, $0 < e \leq 6$;

(ii) $M^1$ is one or more metals, comprising at least one metal which is capable of undergoing oxidation to a higher valence state, and $0.8 \leq b \leq 3$;

(iii) $M^2$ is one or more metals, comprising at least one metal selected from the group consisting of Fe, Co, Ni, Cu, V, Zr, Ti, and Cr, and $1 \leq f \leq 6$;

(iv) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X'' is selected from the group consisting of P, As, Sb, Si, Ge, V, and mixtures thereof; Y' is halogen; $0 \leq x < 3$; and $0 < y < 2$; and $0 < c \leq 3$;

(v) Z is OH, halogen, or mixtures thereof, and $0 \leq d \leq 6$;

(vi) $0 < g \leq 15$;

(vii) $M^1$, $M^2$, X, Y, Z, a, b, c, d, e, f, g, h, i, x and y are selected so as to maintain electroneutrality of said compound; and (viii) said material of the formula $A^3_hMn_iO_4$ has an inner and an outer region, wherein the inner region comprises a cubic spine manganese oxide, and the outer region comprises a manganese oxide that is enriched in $Mn^{+4}$ relative to the inner region.

In a preferred embodiment, $M^1$ and $M^2$ comprise two or more transition metals from Groups 4 to 11 of the Periodic Table. In another preferred embodiment, $M^1$ comprises at least one element from Groups 4 to 11 of the Periodic Table; and at least one element from Groups 2, 3, and 12-16 of the Periodic Table. Preferred embodiments include those where $c=1$, those where $c=2$, and those where $c=3$. Preferred embodiments include those where $a \leq 1$ and $c=1$, those where $a=2$ and $c=1$, and those where $a \geq 3$ and $c=3$. Preferred embodiments for compounds having the formula $A^1_aM^1_b(XY_4)_cZ_d$ also include those having a structure similar to the mineral olivine (herein "olivines"), and those having a structure similar to NASICON (NA Super Ionic CONductor) materials (herein "NASICONs"). In another preferred embodiment, $M^1$ further comprises MO, a +2 ion containing a +4 oxidation state transition metal.

In preferred embodiment, $M^2$ comprises at least one transition metal from Groups 4 to 11 of the Periodic Table, and at least one element from Groups 2, 3, and 12-16 of the Periodic Table. In another preferred embodiment $M^2$ is $M^4_kM^5_mM^6_n$, wherein $M^4$ is a transition metal selected from the group consisting of Fe, Co, Ni, Cu, V, Zr, Ti, Cr, and mixtures thereof; $M^5$ is one or more transition metal from Groups 4 to 11 of the Periodic Table; $M^6$ is at least one metal selected from Group 2, 12, 13, or 14 of the Periodic Table; and $k+m+n=f$.

Preferred embodiments of compounds having the formula $A^2_e M^2_f O_g$ include alkali metal transition metal oxide and more specifically lithium nickel cobalt metal oxide. In another preferred embodiment $A^3_h Mn_i O_4$ has an inner and an outer region, wherein the inner region comprises a cubic spinel manganese oxide, and the outer region comprises a manganese oxide that is enriched in $Mn^{+4}$ relative to the inner region.

Additional particles can be further added to the mixture of cathode active materials to form a terniary blend. The particles can include additional active materials as well as compounds selected from a group of basic compounds. Further blends can be formed by combining four, five, six, etc. compounds together to provide various cathode active material blends.

Another combination of cathode active materials includes a powder comprising two groups of particles having differing chemical compositions, wherein
  (a) the first group of particles comprises a material of the formula $A^1_a M^1_b (XY_4)_c Z_d$; and
  (b) the second group of particles comprises a material selected from materials of the formula $A^1_a M^1_b (XY_4)_c Z_d$; materials of the formula $A^2_e M^3_f O_g$; and mixtures thereof;

wherein
  (i) $A^1$ and $A^2$ are independently selected from the group consisting of Li, Na, K, and mixtures thereof, and $0 < a \leq 8$, and $0 < e \leq 6$;
  (ii) $M^1$ and $M^3$ are, independently, one or more metals, comprising at least one metal which is capable of undergoing oxidation to a higher valence state, and $0.8 \leq b \leq 3$, and $1 \leq f \leq 6$;
  (iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0 \leq x < 3$; and $0 < y < 2$; and $0 < c \leq 3$;
  (iv) Z is OH, halogen, or mixtures thereof, and $0 \leq d \leq 6$;
  (v) $0 < g \leq 15$; and
  (vi) wherein $M^1$, $M^3$, X, Y, Z, a, b, c, d, e, f, g, x and y are selected so as to maintain electroneutrality of said compound.

In a preferred embodiment, $M^1$ comprises at least one element from Groups 4 to 11 of the Periodic Table, and at least one element from Groups 2, 3, and 12-16 of the Periodic Table. In another preferred embodiment, $M^1$ comprises MO, a +2 ion containing a +4 oxidation state metal. In another preferred embodiment, $M^3$ is $M^4_k M^5_m M^6_n$, wherein $M^4$ is a transition metal selected from the group consisting of Fe, Co, Ni, Cu, V, Zr, Ti, Cr, and mixtures thereof; $M^5$ is one or more transition metal from Groups 4 to 11 of the Periodic Table; $M^6$ is at least one metal selected from Group 2, 12, 13, or 14 of the Periodic Table. In another preferred embodiment $A^2_e M^3_f O_g$ comprises a material of the formula $A^3_h Mn_i O_4$ having an inner and an outer region, wherein the inner region comprises a cubic spinel manganese oxide, and the outer region comprises a cubic spinel manganese oxide that is enriched in $Mn^{+4}$ relative to the inner region. In another preferred embodiment, the mixture further comprises a basic compound.

A third cathode active material blend includes two groups of particles having differing chemical compositions, wherein
  (a) the first group of particles comprises an inner and an outer region, wherein the inner region comprises a cubic spinel manganese oxide, and the outer region comprises a manganese oxide that is enriched in $Mn^{+4}$ relative to the inner region; and
  (b) the second group of particles comprises a material selected from materials of the formula $A^1_a M^1_b (XY_4)_c Z_d$; materials of the formula $A^2_e M^3_f O_g$; and mixtures thereof;

wherein
  (i) $A^1$, $A^2$, and $A^3$ are independently selected from the group consisting of Li, Na, K, and mixtures thereof, and $0 < a \leq 8$, $0 < e \leq 6$;
  (ii) $M^1$ and $M^3$ are, independently, one or more metals, comprising at least one metal which is capable of undergoing oxidation to a higher valence state, and $0.8 \leq b \leq 3$, and $1 \leq f \leq 6$;
  (iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0 \leq x < 3$; and $0 < y < 2$; and $0 < c \leq 3$;
  (iv) Z is OH, halogen, or mixtures thereof, and $0 \leq d \leq 6$;
  (v) $0 < g \leq 15$; and
  (vi) wherein $M^1$, $M^3$, X, Y, Z, a, b, c, d, e, f, g, x and y are selected so as to maintain electroneutrality of said compound.

A terniary blend of cathode active materials includes three groups of particles having differing chemical compositions, wherein each group of particles comprises a material selected from
  (a) materials of the formula $A^1_a M^1_b (XY_4)_c Z_d$;
  (b) materials of the formula $A^2_e M^3_f O_g$; and mixtures thereof; wherein
    (i) $A^1$ and $A^2$ are independently selected from the group consisting of Li, Na, K, and mixtures thereof, and $0 < a \leq 8$, and $0 < e \leq 6$;
    (ii) $M^1$ and $M^3$ independently comprise one or more metals, comprising at least one metal which is capable of undergoing oxidation to a higher valence state, and $0.8 \leq b \leq 3$, and $1 \leq f \leq 6$;
    (iii) $XY_4$ is selected from the group consisting of $X'O_{4-x}Y'_x$, $X'O_{4-y}Y'_{2y}$, $X''S_4$, and mixtures thereof, where X' is selected from the group consisting of P, As, Sb, Si, Ge, V, S, and mixtures thereof; X" is selected from the group consisting of P, As, Sb, Si, Ge, V, and mixtures thereof; Y' is halogen; $0 \leq x < 3$; and $0 < y < 2$; and $0 < c \leq 3$;
    (iv) Z is OH, halogen, or mixtures thereof, and $0 \leq d \leq 6$;
    (v) $0 < g \leq 15$; and
    (vi) wherein $M^1$, $M^3$, X, Y, Z, a, b, c, d, e, f, g, x and y are selected so as to maintain electroneutrality of said compound.

One embodiment comprises: (a) a first material having the general formula $A_a M_b (XY_4)_c Z_d$, where A is Li, $XY_4$ is $PO_4$, and c is 1; with (b) a second material of the formula $A_e M_f O_g$. In a preferred embodiment, the first material is $LiFe_{1-q}Mg_q PO_4$ where $0 < q < 0.5$. Preferred first materials are selected from the group consisting of $LiFe_{0.9}Mg_{0.1}PO_4$; $LiFe_{0.8}Mg_{0.2}PO4$; $LiFe_{0.95}Mg_{0.05}PO_4$; and mixtures thereof. Preferably the second material is selected from the group consisting of $LiNi_{0.8}Co_{0.15}Al_{0.05}O_2$; $LiNiO_2$; $LiCoO_2$; $\gamma\text{-}LiV_2O_5$; $LiMnO_2$; $LiMoO_2$; $Li_2CuO_2$; $LiNi_rCo_sM_tO_2$; $LiMn_2O_4$, modified manganese oxide material of formula $LiMn_tO_4$, and mixtures thereof. In a preferred embodiment, the second material is selected from the group consisting of $LiNi_{0.8}Co_{0.15}Al_{0.05}O_2$; $LiNiO_2$; $LiCoO_2$; $LiNi_{1-x}Co_xO_2$, γ-LiV$_2$O$_5$; and mixtures thereof. Preferably such preferred blends comprise from about 50% to about 80% (by weight) of the first material, more preferably from about 60% to about 70% of the first material.

Another embodiment of the present invention the active material blend comprises two or more groups of particles having differing chemical compositions, wherein each group of particles comprises a material selected from:

(a) materials of the formula $A^1_a M^1_b (XY_4)_c Z_d$; and (b) materials of the formula LiMn$_2$O$_4$ or Li$_{1+z}$Mn$_{2-z}$O;

wherein (i) $A^1$ is selected from the group consisting of Li, Na, K, and mixtures thereof, and $0<a\leqq 8$;

(ii) $M^1$ is one or more metals, comprising at least one metal which is capable of undergoing oxidation to a higher valence state, and $0.8\leqq b\leqq 3$;

(iii) XY$_4$ is selected from the group consisting of X'O$_{4-x}$Y'$_x$, X'O$_{4-y}$Y'$_{2y}$, X"S$_4$, and mixtures thereof, where X' is selected from the group consisting of P, As, Sb, Si, Ge, V, S, and mixtures thereof; X" is selected from the group consisting of P, As, Sb, Si, Ge, V and mixtures thereof; Y' is halogen; $0\leqq x<3$; and $0<y<2$; and $0<c\leqq 3$;

(v) Z is OH, halogen, or mixtures thereof, and $0\leqq d\leqq 6$; and (vi) $M^1$, X, Y, Z, a, b, c, d, x, y and z are selected so as to maintain electroneutrality of said compound.

The LiMn$_2$O$_4$ or Li$_{1+z}$Mn$_{2-z}$O$_4$ useful in this embodiment can be "treated" as known to those skilled in the art. The "treated" lithium manganese oxide are "treated" with a basic material that will react with acids in a battery configuration, which acids would otherwise react with the lithium manganese oxide. For example, the LiMn$_2$O$_4$ or Li$_{1+z}$Mn$_{2-z}$O$_4$ can be coated with Li$_2$MnO$_3$ or Na$_2$MnO$_3$ as disclosed in U.S. Patent Application 20020070374-A1 published on Jun. 13, 2002. Another manner of "treating" the LiMn$_2$O$_4$ or Li$_{1+z}$Mn$_{2-z}$O$_4$ is to simply mix it with a basic compound that will neutralize the acids in a battery that would react with the lithium manganese oxide as disclosed in U.S. Pat. No. 6,183,718 issued on Feb. 6, 2001. JP 7262984 to Yamamoto discloses LiMn$_2$O$_4$ coated with Li$_2$MnO$_3$ wherein the complex is formed by the decomposition product of LiMn$_2$O$_4$ in the presence of LiOH. Another example of treated lithium manganese oxide is described in U.S. Pat. No. 6,322,744 issued Nov. 27, 2001 wherein a cationic metal species is bound to the spinel at anionic sites of the lithium manganese particle surface. Another example of a "treated" lithium manganese oxide is a composition comprising lithium-enriched manganese oxide represented by the general formula Li$_{1+z}$Mn$_{2-z}$O$_4$ wherein $0.08<z\leqq 0.20$, which is the decomposition product of a (a) spinel lithium manganese oxide of the general formula Li$_{1+x}$Mn$_{2-x}$O$_4$ wherein $0<x\leqq 0.20$, in the presence of (b) lithium carbonate wherein x<z. (See U.S. Pat. No. 6,183,718 issued Feb. 6, 2001.)

Another embodiment comprises (a) a first material selected from the group consisting of LiFe$_{0.9}$Mg$_{0.1}$PO$_4$; LiFe$_{0.8}$Mg$_{0.2}$PO4; LiFe$_{0.95}$Mg$_{0.05}$PO$_4$; and mixtures thereof; and (b) a second material having the formula LiNi$_r$Co$_s$M$_t$O$_2$, wherein $0<(r+s)\leqq 1$, and $0\leqq t<1$. Preferably M is at least one metal selected from Group 2, 12, 13, or 14 of the Periodic Table. More preferably M is selected from the group consisting of Mg, Ca, Al, and mixtures thereof. Preferably, the second material is selected from the group consisting of LiNi$_{0.8}$Co$_{0.15}$Al$_{0.05}$O$_2$, LiNi$_{0.6}$Co$_{0.2}$Al$_{0.2}$O$_2$, LiNi$_{0.8}$Co$_{0.15}$Mg$_{0.05}$O$_2$, LiNi$_{0.8}$Cu$_{0.15}$Ca$_{0.05}$O$_2$, NaNi$_{0.8}$Co$_{0.15}$Al$_{0.05}$O$_2$, and mixtures thereof. Preferably such blends comprise from about 50% to about 80% (by weight) of the first material, more preferably from about 60% to about 70% of the first material.

In another embodiment, the blends of this invention comprise (a) a first material having the general formula $A_a M_b (XY_4)_c Z_d$, preferably where A is Li, XY$_4$ is PO$_4$, and c is 1; (b) a second material of the formula $A_e M_f O_g$; and (c) a basic compound, preferably Li$_2$CO$_3$. In a preferred embodiment, the first material is LiFe$_{0.09}$Mg$_{0.1}$PO$_4$; LiFe$_{0.8}$Mg$_{0.2}$PO$_4$; LiFe$_{0.95}$Mg$_{0.05}$PO$_4$; LiCo$_{0.8}$Fe$_{0.1}$Al$_{0.025}$Mg$_{0.05}$PO$_{3.975}$F$_{0.025}$; and mixtures thereof; the second material is LiMn$_2$O$_4$; and the basic compound is Li$_2$CO$_3$. In another preferred embodiment, the second material is a modified manganese oxide material of formula LiMn$_t$O$_4$. Preferably such preferred blends comprise from about 50% to about 80% (by weight) of the first material, more preferably from about 60% to about 70% of the first material.

Another embodiment comprises: (a) a first material having the general formula Li$_a$Co$_u$Fe$_v$M$^{13}{}_w$M$^{14}{}_{aa}$M$^{15}{}_{bb}$XY$_4$; and (b) a second material of the formula $A_e M_f O_g$. In a preferred embodiment, the first material is LiCo$_{0.8}$Fe$_{0.1}$Al$_{0.025}$Mg$_{0.05}$PO$_{3.975}$F$_{0.025}$ Preferably the second material is selected from the group consisting of LiNi$_{0.8}$Co$_{0.15}$Al$_{0.05}$O$_2$; LiNiO$_2$; LiCoO$_2$; γ-LiV$_2$O$_5$; LiMnO$_2$; LiMoO$_2$; Li$_2$CuO$_2$; LiNi$_r$Co$_s$M$_t$O$_2$; LiMn$_2$O$_4$, modified manganese oxide material of formula LiMn$_t$O$_4$, and mixtures thereof. In a preferred embodiment, the second material is selected from the group consisting of LiNi$_{0.8}$CO$_{0.15}$Al$_{0.05}$O$_2$; LiNiO$_2$; LiCoO$_2$; γ-LiV$_2$O$_5$; and mixtures thereof. Preferably such preferred blends comprise from about 50% to about 80% (by weight) of the first material, more preferably from about 60% to about 70% of the first material.

Another embodiment comprises (a) a first material having the general formula Li$_a$Co$_u$Fe$_v$M$^{13}{}_w$M$^{14}{}_{aa}$M$^{15}{}_{bb}$XY$_4$; and (b) a second material having the formula LiNi$_r$Co$_s$M$_t$O$_2$ wherein $0<(r+s)\leqq 1$, and $0\leqq t<1$. Preferably M is at least one metal selected from Group 2, 12, 13, or 14 of the Periodic Table. More preferably M is selected from the group consisting of Mg, Ca, Al, and mixtures thereof. Preferably, the second material is selected from the group consisting of LiNi$_{0.8}$Co$_{0.15}$Al$_{0.05}$O$_2$, LiNi$_{0.6}$Co$_{0.2}$Al$_{0.2}$O$_2$, LiNi$_{0.8}$Co$_{0.15}$Mg$_{0.05}$O$_2$, LiNi$_{0.8}$Co$_{0.15}$Ca$_{0.05}$O$_2$, NaNi$_{0.8}$Co$_{0.15}$Al$_{0.05}$O$_2$, and mixtures thereof. Preferably such preferred blends comprise from about 50% to about 80% (by weight) of the first material, more preferably from about 60% to about 70% of the first material.

Another embodiment comprises: (a) a first material having the general formula Li$_a$M$^{11}{}_b$(PO4)Z$_d$, where $0<d\leqq 4$, and Z is preferably F; and (b) a second material of the formula $A_e M_f O_g$. Preferably the second material is selected from the group consisting of LiNi$_{0.8}$CO$_{0.15}$Al$_{0.05}$O$_2$; LiNiO$_2$; LiCoO$_2$; γ-LiV$_2$O$_5$, LiMnO$_2$; LiMoO$_2$; Li$_2$CuO$_2$; LiNi$_r$Co$_s$M$_t$O$_2$; LiMn$_2$O$_4$, modified manganese oxide material of formula LiMn$_t$O$_4$, and mixtures thereof. In a preferred embodiment, the second material is selected from the group consisting of LiNi$_{0.8}$Co$_{0.15}$Al$_{0.05}$O$_2$; LiNiO$_2$; LiCoO$_2$; γ-LiV$_2$O$_5$; and mixtures thereof. Preferably such preferred blends comprise from about 50% to about 80% (by weight) of the first material, more preferably from about 60% to about 70% of the first material.

Another embodiment comprises (a) a first material having the general formula Li$_a$M$^{11}{}_b$(PO4)Z$_d$, where $0<d\leqq 4$, and Z is preferably F; and (b) a second material having the formula LiNi$_r$CO$_s$M$_t$O$_2$ wherein $0<(r+s)\leqq 1$, and $0\leqq t<1$. Preferably M is at least one metal selected from Group 2, 12, 13, or 14 of the Periodic Table. More preferably M is selected from the group consisting of Mg, Ca, Al, and mixtures thereof. Preferably, the second material is selected from the group consisting of $LiNi_{0.8}Co_{0.15}Al_{0.05}O_2$, $LiNi_{0.6}Co_{0.2}Al_{0.2}O_2$, $LiNi_{0.8}Co_{0.15}Mg_{0.05}O_2$, $LiNi_{0.8}Co_{0.15}Ca_{0.05}O_2$, $NaNi_{0.8}Co_{0.15}Al_{0.05}O_2$, and mixtures thereof. Preferably such preferred blends comprise from about 50% to about 80% (by weight) of the first material, more preferably from about 60% to about 70% of the first material.

Another embodiment comprises: (a) a first material having the general formula $A_aM_b(XY_4)_cZ_d$, where A is Li, $XY_4$ is $PO_4$, and c is 1, with (b) a second material of the formula $A_aM_b(XY_4)_cZ_d$. In a preferred embodiment, the first material is $LiFe_{1-q}Mg_qPO4$ where $0<q<0.5$, preferably selected from the group consisting of $LiFe_{0.9}Mg_{0.1}PO_4$; $LiFe_{0.8}Mg_{0.2}PO_4$; $LiFe_{0.95}Mg_{0.05}PO_4$; and mixtures thereof. In another preferred embodiment, the first material is of the formula $Li_aCo_uFe_vM^{13}{}_wM^{14}{}_{aa}M^{15}{}_{bb}XY_4$; preferably $LiCo_{0.8}Fe_{0.1}Al_{0.025}Mg_{0.05}PO_{3.975}F_{0.025}$. Preferred second materials include those selected from the group consisting of $LiFePO_4$; $LiFe_{0.09}Mg_{0.01}P_4$; $LiFe_{0.8}Mg_{0.2}PO_4$; $LiCo_{0.9}Mg_{0.1}PO4$, $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Al_{0.025}Mg_{0.05}PO_{3.975}F_{0.025}$ and mixtures thereof. Preferably such preferred blends comprise from about 50% to about 80% (by weight) of the first material, more preferably from about 60% to about 70% of the first material. In some embodiments, such blends additionally comprise a basic compound, preferably $Li_2CO_3$.

Another embodiment comprises: (a) a first material having the general formula $A_aM_b(XY_4)_cZ_d$, having an olivine structure where A is Li, a is about 1, $XY_4$ is $PO_4$, and c is 1, with (b) a second material of the formula $A_aM_b(XY_4)_c$ having a NASICON structure, where A is Li, $XY_4$ is $PO_4$, and c is 3. In a preferred embodiment, the first material is $LiFe_{1-q}Mg_qPO4$ where $0<q<0.5$, preferably selected from the group consisting of $LiFe_{0.9}Mg_{0.1}PO_4$; $LiFe_{0.8}Mg_{0.2}PO_4$; $LiFe_{0.95}Mg_{0.05}PO_4$; and mixtures thereof. In another preferred embodiment, the first material is of the formula $Li_aCo_uFe_vM^{13}{}_wM^{14}{}_{aa}M^{15}{}_{bb}XY_4$; preferably $LiCo_{0.8}Fe_{0.1}Al_{0.025}Mg_{0.05}PO_{3.975}F_{0.025}$. Preferred second material include those selected from the group consisting of $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$, $Li_3Ti_2(PO4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; and mixtures thereof. Preferably such preferred blends comprise from about 50% to about 80% (by weight) of the first material, more preferably from about 60% to about 70% of the first material. In some embodiments, such blends additionally comprise a basic compound, preferably $Li_2CO_3$, Another embodiment comprises: (a) a first material of the formula $A_aM_b(XY_4)_cZ_d$ having the having a NASICON structure, where A is Li, $XY_4$ is $PO_4$, and c is 3; and a second material a second material of the formula $A_eM_fO_g$. Preferably, the first material is selected from the group consisting of $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; and mixtures thereof. Preferably the second material is selected from the group consisting of $LiNi_{0.8}Co_{0.15}Al_{0.05}O_2$; $LiNiO_2$; $LiCoO_2$; $\gamma$-$LiV_2O_5$; $LiMnO_2$; $LiMoO_2$; $Li_2CuO_2$; $LiNi_rCo_sM_tO_2$; $LiMn_2O_4$, modified manganese oxide material of formula $LiMn_yO_4$, and mixtures thereof. In a preferred embodiment, the second material is selected from the group consisting of $LiNi_{0.8}Co_{0.15}Al_{0.05}O_2$; $LiNiO_2$; $LiCoO_2$; $\gamma$-$LiV_2O_5$; and mixtures thereof. Preferably such preferred blends comprise from about 50% to about 80% (by weight) of the first material, more preferably from about 60% to about 70% of the first material. In some embodiments, such blends additionally comprise a basic compound, preferably $Li_2CO_3$, Another embodiment comprises: (a) a first material of the formula $A_aM_b(XY_4)_cZ_d$ having a NASICON structure, where A is Li, $XY_4$ is $PO_4$, and c is 3; and a second material a second material of the formula $LiNi_rCo_sM_tO_2$ wherein $0<(r+s)\leq 1$, and $0\leq t<1$, preferably M is at least one metal selected from Group 2, 12, 13, or 14 of the Periodic Table, more preferably M is selected from the group consisting of Mg, Ca, Al, and mixtures thereof. Preferably, the first material is selected from the group consisting of $Li_3V_2(PO_4)_3$; $Li_3Fe_2(PO_4)_3$; $Li_3Mn_2(PO_4)_3$; $Li_3FeTi(PO4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO4)_3$; $Li_3TiNi(PO_4)_3$; and mixtures thereof. Preferably, the second material is selected from the group consisting of $LiNi_{0.8}Co_{0.15}Al_{0.05}O_2$, $LiNi_{0.6}Co_{0.2}Al_{0.2}O_2$, $LiNi_{0.8}Co_{0.15}Mg_{0.05}O_2$, $LiNi_{0.8}Co_{0.15}Ca_{0.05}O_2$, $NaNi_{0.8}Co_{0.15}Al_{0.05}O_2$, and mixtures thereof. In some embodiments, such blends additionally comprise a basic compound, preferably $Li_2CO_3$. Preferably such preferred blends comprise from about 50% to about 80% (by weight) of the first material, more preferably from about 60% to about 70% of the first material. In some embodiments, such blends additionally comprise a basic compound, preferably $Li_2CO_3$.

Another embodiment comprises (a) as a first material, a modified manganese oxide material of formula $LiMn_yO_4$; and (b) a second material of the formula $A_aM_b(XY_4)_cZ_d$. In a preferred embodiment, the second material is $LiFe_{1-q}Mg_qPO4$ where $0<q<0.5$, preferably selected from the group consisting of $LiFe_{0.9}Mg_{0.1}PO_4$; $LiFe_{0.8}Mg_{0.2}PO_4$; $LiFe_{0.95}Mg_{0.05}PO_4$; and mixtures thereof. In another preferred embodiment, the second material is of the formula $Li_aCo_uFe_vM^{13}{}_wM^{14}{}_{aa}M^{15}{}_{bb}XY_4$; preferably $LiCo_{0.8}Fe_{0.1}Al_{0.025}Mg_{0.05}PO_{3.975}F_{0.025}$. Preferred second materials include those selected from the group consisting of $LiFePO_4$, $LiFe_{0.9}Mg_{0.1}PO_4$, $LiFe_{0.8}Mg_{0.2}PO_4$, $LiFe_{0.95}Mg_{0.05}PO_4$, $LiCo_{0.9}Mg_{0.1}PO_4$, $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO4$, $LiCo_{0.8}Fe_{0.01}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Al_{0.025}Mg_{0.05}PO_{3.975}F_{0.025}$ and mixtures thereof. Preferably such preferred blends comprise from about 50% to about 80% (by weight) of the first material, more preferably from about 60% to about 70% of the first material. In some embodiments, such blends additionally comprise a basic compound, preferably $Li_2CO_3$.

Another embodiment comprises (a) as a first material, a modified manganese oxide material of formula $LiMn_tO_4$; and (b) a second material of the formula $A_eM_fO_g$. Preferably the second material is selected from the group consisting of $LiNi_{0.8}Co_{0.15}Al_{0.05}O_2$; $LiNiO_2$; $LiCoO_2$; $\gamma$-$LiV_2O_5$; $LiMnO_2$; $LiMoO_2$; $Li_2CuO_2$; and mixtures thereof. Preferably such preferred blends comprise from about 50% to about 80% (by weight) of the first material, more preferably from about 60% to about 70% of the first material. In some embodiments, such blends additionally comprise a basic compound, preferably $Li_2CO_3$.

Another embodiment comprises (a) as a first material, an oxide material of formula $A_eM_fO_g$; and (b) a second material of the formula $A_eM_fO_g$. Preferably the second material is selected from the group consisting of $LiNi_{0.8}Co_{0.15}Al_{0.05}O_2$; $LiNiO_2$; $LiCoO_2$; $\gamma$-$LiV_2O_5$; $LiMnO_2$; $LiMoO_2$; $Li_2CuO_{0.2}$; and mixtures thereof. If the first material is $LiMn_2O_4$, then the second material is not $LiNiO_2$; $LiCoO_2$, $LiNi_rCo_sO_2$ or $Li_2CuO_2$. Preferably such preferred blends comprise from about 50% to about 80% (by weight) of the first material, more preferably from about 60% to about 70% of the first material. In some embodiments, such blends additionally comprise a basic compound, preferably $Li_2CO_3$.

Another embodiment comprises: (a) a first material having the general formula $A_aM_b(XY_4)_cZ_d$, having a NASICON structure where A is Li, a is about 3, $XY_4$ is $PO_4$, and c is 3, with (b) a second material of the formula $A_aM_b(XY_4)_cZ_d$. Preferably, the first material is selected from the group consisting of $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; and mixtures thereof. In a preferred embodiment, the second material is selected from the group consisting of $Li_3V_2(PO_4)_3$; $Li_3Fe_2(PO_4)_3$; $Li_3Mn_2(PO_4)_3$; $Li_3FeTi(PO_4)_3$; $Li_3CoMn(PO_4)_3$; $Li_3FeV(PO_4)_3$; $Li_3VTi(PO_4)_3$; $Li_3FeCr(PO_4)_3$; $Li_3FeMo(PO_4)_3$; $Li_3FeNi(PO_4)_3$; $Li_3FeMn(PO_4)_3$; $Li_3FeAl(PO_4)_3$; $Li_3FeCo(PO_4)_3$; $Li_3Ti_2(PO_4)_3$; $Li_3TiCr(PO_4)_3$; $Li_3TiMn(PO_4)_3$; $Li_3TiMo(PO_4)_3$; $Li_3TiCo(PO_4)_3$; $Li_3TiAl(PO_4)_3$; $Li_3TiNi(PO_4)_3$; and mixtures thereof. In another preferred embodiment, the second material is $LiFe_{1-q}Mg_qPO_4$ where $0<q<0.5$, preferably selected from the group consisting of $LiFe_{0.9}Mg_{0.01}PO_4$, $LiFe_{0.8}Mg_{0.2}PO_4$; $LiFe_{0.95}Mg_{0.05}PO_4$; and mixtures thereof. In another preferred embodiment, the second material is of the formula $Li_aCo_uFe_vM^{13}_wM^{14}_{aa}M^{15}_{bb}XY_4$; preferably $LiCo_{0.8}Fe_{0.1}Al_{0.025}Mg_{0.05}PO_{3.975}F_{0.025}$. Preferred second materials include those selected from the group consisting of $LiFePO_4$; $LiFe_{0.9}Mg_{0.1}PO4$; $LiFe_{0.8}Mg_{0.2}PO4$, $LiCo_{0.9}Mg_{0.1}PO_4$, $Li_{1.025}Co_{0.85}Fe_{0.05}Al_{0.025}Mg_{0.05}PO_4$, $Li_{1.025}Co_{0.80}Fe_{0.10}Al_{0.025}Mg_{0.05}PO_4$, $Li_{1.025}Co_{0.75}Fe_{0.15}Al_{0.025}Mg_{0.05}PO_4$, $Li_{1.025}Co_{0.7}(Fe_{0.4}Mn_{0.6})_{0.2}Al_{0.025}Mg_{0.05}PO_4$, $LiCo_{0.8}Fe_{0.1}Al_{0.025}Ca_{0.05}PO_{3.975}F_{0.025}$, $LiCo_{0.8}Fe_{0.1}Al_{0.025}Mg_{0.05}PO_{3.975}F_{0.025}$, $LiCo_{0.8}Fe_{0.1}Ti_{0.025}Mg_{0.05}PO_4$; $Li_{1.025}Co_{0.8}Fe_{0.1}Ti_{0.025}Al_{0.025}PO_4$; $Li_{1.025}Co_{0.8}Fe_{0.1}Ti_{0.025}Mg_{0.025}PO_{3.975}F_{0.025}$; $LiCo_{0.825}Fe_{0.1}Ti_{0.025}Mg_{0.025}PO_4$; $LiCo_{0.85}Fe_{0.075}Ti_{0.025}Mg_{0.025}PO_4$; $LiCo_{0.8}Fe_{0.1}Al_{0.025}Mg_{0.05}PO_{3.975}F_{0.025}$ and mixtures thereof. Preferably such preferred blends comprise from about 50% to about 80% (by weight) of the first material, more preferably from about 60% to about 70% of the first material.

More specifically, a preferred embodiment includes (a) a first active material of the formula $LiFe_{0.95}Mg_{0.05}PO_4$ with (b) a second active material selected from the group consisting of $LiNiO_2$, $LiCoO_2$, $LiNi_xCo_{1-x}O_2$ where $0<x<1$, $Li_3V_2(PO_4)_3$, $Li_{3+x}Ni_2(PO_4)_3$ where $0<x<2$, $Li_{3+x}Cu_2(PO_4)_3$ where $0<x<2$; $Li_{3+x}Co_2(PO_4)_3$ where $0<x<2$, $Li_{3+x}Mn_2(PO_4)_3$ where $0<x<2$, $\gamma$-$LiV_2O_5$, $LiMn_2O_4$, $Li_2CuO_2$, $LiFePO_4$, $LiMnPO_4$, $LiFe_xMn_{1-x}PO_4$ where $0<x<1$; $LiVPO_4F$ and $Li_{1-x}VPO_4F$ where $0<x<1$.

Another preferred embodiment includes (a) a first active material of the formula $LiCo_{0.8}Fe_{0.1}Al_{0.025}Mg_{0.05}PO_{3.975}F_{0.025}$ and (b) a second active material selected from the group consisting of $LiNiO_2$, $LiCoO_2$, $LiNi_xCo_{1-x}O_2$ where $0<x<1$, $Li_3V_2(PO_4)_3$, $Li_{3+x}V_2(PO_4)_3$ where $0<x<2$, $LiNiPO_4$, $LiCoPO_4$, $LiNi_xCo_{1-x}PO_4$ where $0<x<1$, and $Li_{1-x}VPO_4F$ where $0 \leq x<1$.

Methods of Manufacturing $A^1_aM^1_b(XY_4)_cZ_d$:

Active materials of general formula $A^1_aM^1_b(XY_4)_cZ_d$ are readily synthesized by reacting starting materials in a solid state reaction, with or without simultaneous oxidation or reduction of the metal species involved. According to the desired values of a, b, c, and d in the product, starting materials are chosen that contain "a" moles of alkali metal $A^1$ from all sources, "b" moles of metals $M^1$ from all sources, "c" moles of phosphate (or other $XY_4$ species) from all sources, and "d" moles of halide or hydroxide Z, again taking into account all sources. As discussed below, a particular starting material may be the source of more than one of the components $A^1$, $M^1$, $XY_4$, or Z. Alternatively it is possible to run the reaction with an excess of one or more of the starting materials. In such a case, the stoichiometry of the product will be determined by the limiting reagent among the components $A^1$, $M^1$, $XY_4$, and Z. Because in such a case at least some of the starting materials will be present in the reaction product mixture, it is usually desirable to provide exact molar amounts of all the starting materials.

In one aspect, the moiety $XY_4$ of the active material comprises a substituted group represented by $X'O_{4-x}Y'_x$, where x is less than or equal to 1, and preferably less than or equal to about 0.1. Such groups may be synthesized by providing starting materials containing, in addition to the alkali metal and other metals, phosphate or other $X'O_4$ material in a molar amount equivalent to the amount necessary to produce a reaction product containing $X'O_4$. Where Y' is F, the starting materials further comprise a source of fluoride in a molar amount sufficient to substitute F in the product as shown in the formula. This is generally accomplished by including at least "x" moles of F in the starting materials. For embodiments where d>0, the fluoride source is used in a molar limiting quantity such that the fluorine is incorporated as a Z-moiety. Sources of F include ionic compounds containing fluoride ion ($F^-$) or hydrogen difluoride ion ($HF_2^-$). The cation may be any cation that forms a stable compound with the fluoride or hydrogen difluoride anion. Examples include +1, +2, and +3 metal cations, as well as ammonium and other nitrogen-containing cations. Ammonium is a preferred cation because it tends to form volatile by-products that are readily removed from the reaction mixture.

Similarly, to make $X'O_{4-x}N_x$, starting materials are provided that contain "x" moles of a source of nitride ion.

Sources of nitride are among those known in the art including nitride salts such as $Li_3N$ and $(NH_4)_3N$.

It is preferred to synthesize the active materials of the invention using stoichiometric amounts of the starting materials, based on the desired composition of the reaction product expressed by the subscripts a, b, c, and d above. Alternatively it is possible to run the reaction with a stoichiometric excess of one or more of the starting materials. In such a case, the stoichiometry of the product will be determined by the limiting reagent among the components. There will also be at least some unreacted starting material in the reaction product mixture. Because such impurities in the active materials are generally undesirable (with the exception of reducing carbon, discussed below), it is generally preferred to provide relatively exact molar amounts of all the starting materials.

The sources of components $A^1$, $M^1$, phosphate (or other $XY_4$ moiety) and optional sources of F or N discussed above, and optional sources of Z may be reacted together in the solid state while heating for a time and at a temperature sufficient to make a reaction product. The starting materials are provided in powder or particulate form. The powders are mixed together with any of a variety of procedures, such as by ball milling, blending in a mortar and pestle, and the like. Thereafter the mixture of powdered starting materials may be compressed into a pellet and/or held together with a binder material to form a closely cohering reaction mixture. The reaction mixture is heated in an oven, generally at a temperature of about 400° C. or greater until a reaction product forms.

Another means for carrying out the reaction at a lower temperature is a hydrothermal method. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

The reaction may be carried out without redox, or if desired, under reducing or oxidizing conditions. When the reaction is carried out under reducing conditions, at least some of the transition metals in the starting materials are reduced in oxidation state. When the reaction is done without redox, the oxidation state of the metal or mixed metals in the reaction product is the same as in the starting materials. Oxidizing conditions may be provided by running the reaction in air. Thus, oxygen from the air is used to oxidize the starting material containing the transition metal.

The reaction may also be carried out with reduction. For example, the reaction may be carried out in a reducing atmosphere such as hydrogen, ammonia, methane, or a mixture of reducing gases. Alternatively, the reduction may be carried out in situ by including in the reaction mixture a reductant that will participate in the reaction to reduce a metal M, but that will produce by-products that will not interfere with the active material when used later in an electrode or an electrochemical cell. The reductant is described in greater detail below.

Sources of alkali metal include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germinates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals $M^1$ include salts or compounds of any of the transition metals, alkaline earth metals, or lanthanide metals, as well as of non-transition metals such as aluminum, gallium, indium, thallium, tin, lead, and bismuth. The metal salts or compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product. In a preferred embodiment, the metal sources also include a +2 non-transition metal. Also preferably, at least one metal source is a source of a +3 non-transition metal. In embodiments comprising Ti, a source of Ti is provided in the starting materials and the compounds are made using reducing or non-reducing conditions depending on the other components of the product and the desired oxidation state of Ti and other metals in the final product. Suitable Ti-containing precursors include $TiO_2$, $Ti_2O_3$, and TiO.

Sources of the desired starting material anions such as the phosphates, halides, and hydroxides are provided by a number of salts or compounds containing positively charged cations in addition to the source of phosphate (or other $XY_4$ species), halide, or hydroxide. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate, halide, or hydroxide starting materials are preferably provided in particulate or powder form. Hydrates of any of the above may be used, as can mixtures of the above.

A starting material may provide more than one of the components $A^1$, $M^1$, $XY_4$, and Z, as is evident in the list above. In various embodiments of the invention, starting materials are provided that combine, for example, the alkali metal and halide together, or the metal and the phosphate. Thus for example, lithium, sodium, or potassium fluoride may be reacted with a metal phosphate such as vanadium phosphate or chromium phosphate, or with a mixture of metal compounds such as a metal phosphate and a metal hydroxide. In one embodiment, a starting material is provided that contains alkali metal, metal, and phosphate. There is complete flexibility to select starting materials containing any of the components of alkali metal $A^1$, metal $M^1$, phosphate (or other $XY_4$ moiety), and halide/hydroxide Z, depending on availability. Combinations of starting materials providing each of the components may also be used.

In general, any anion may be combined with the alkali metal cation to provide the alkali metal source starting material, or with the metal M cation to provide the metal M starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to volatile by-products. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture.

The sources of components $A^1$, $M^1$, phosphate (or other $XY_4$ moiety), and Z may be reacted together in the solid state while heating for a time and temperature sufficient to make a reaction product. The starting materials are provided in powder or particulate form. The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms. However, when Z in the active material is hydroxide, it is preferable to heat at a lower temperature so as to avoid volatilizing water instead of incorporating hydroxyl into the reaction product.

When the starting materials contain hydroxyl for incorporation into the reaction product, the reaction temperature is preferably less than about 400° C., and more preferably about 250° C. or less. One way of achieving such temperatures is to carry out the reaction hydrothermally. In a hydrothermal reaction, the starting materials are mixed with a small amount of a liquid such as water, and placed in a pressurized bomb. The reaction temperature is limited to that which can be achieved by heating the liquid water under pressure, and the particular reaction vessel used.

The reaction may be carried out without redox, or if desired under reducing or oxidizing conditions. When the reaction is done without redox, the oxidation state of the metal or mixed metals in the reaction product is the same as in the starting materials. Oxidizing conditions may be provided by running the reaction in air. Thus, oxygen from the air is used to oxidize the starting material cobalt having an average oxidation state of +2.67 (8/3) to an oxidation state of +3 in the final product.

The reaction may also be carried out with reduction. For example, the reaction may be carried out in a reducing atmosphere such as hydrogen, ammonia, methane, or a mixture of reducing gases. Alternatively, the reduction may be carried out in situ by including the reaction mixture a reductant that will participate in the reaction to reduce the metal M, but that will produce by-products that will not interfere with the active material when used later in an electrode or an electrochemical cell. One convenient reductant to use to make the active materials of the invention is a reducing carbon. In a preferred embodiment, the reaction is carried out in an inert atmosphere such as argon, nitrogen, or carbon dioxide. Such reducing carbon is conveniently provided by elemental carbon, or by an organic material that can decompose under the reaction conditions to form elemental carbon or a similar carbon containing species that has reducing power. Such organic materials include, without limitation, glycerol, starch, sugars, cokes, and organic polymers which carbonize or pyrolyze under the reaction conditions to produce a reducing form of carbon. A preferred source of reducing carbon is elemental carbon.

The stoichiometry of the reduction can be selected along with the relative stoichiometric amounts of the starting components $A^1$, $M^1$, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

The extent of reduction is not dependent simply on the amount of hydrogen present—it is always available in excess. It is dependent on the temperature of reaction. Higher temperatures will facilitate greater reducing power. In addition whether one gets e.g. $(PO_4)_3F$ or $P_3O_{11}F$ in the final product depend on the thermodynamics of formation of the product. The lower energy product will be favored.

At a temperature where only one mole of hydrogen reacts, the $M^{+5}$ in the starting material is reduced to $M^{+4}$, allowing for the incorporation of only 2 lithiums in the reaction product. When 1.5 moles of hydrogen react, the metal is reduced to $M^{+3.5}$ on average, considering the stoichiometry of reduction. With 2.5 moles of hydrogen, the metal is reduced to $M^{+2.5}$ on average. Here there is not enough lithium in the balanced reaction to counterbalance along with the metal the −10 charge of the $(PO_4)_3F$ group. For this reason, the reaction product has instead a modified $P_3O_{11}F$ moiety with a charge of −8, allowing the $Li_3$ to balance the charge. When using a reducing atmosphere, it is difficult to provide less than an excess of reducing gas such as hydrogen. Under such as a situation, it is preferred to control the stoichiometry of the reaction by the other limiting reagents. Alternatively the reduction may be carried out in the presence of reducing carbon such as elemental carbon. Experimentally, it would be possible to use precise amounts of reductant carbon as illustrated in the table for the case of reductant hydrogen to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

The carbothermal reduction method of synthesis of mixed metal phosphates has been described in PCT Publication WO/01/53198, Barker et al., incorporated by reference herein. The carbothermal method may be used to react starting materials in the presence of reducing carbon to form a variety of products. The carbon functions to reduce a metal ion in the starting material metal M source. The reducing carbon, for example in the form of elemental carbon powder, is mixed with the other starting materials and heated. For best results, the temperature should be about 400° C. or greater, and up to about 950° C. Higher temperatures may be used, but are usually not required.

Generally, higher temperature (about 650° C. to about 1000° C.) reactions produce CO as a by-product whereas $Co_2$ production is favored at lower temperatures (generally up to about 650° C.). The higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $Co_2$ reaction involves an increase in carbon oxidation state of +4

(from 0 to 4) and the C to CO reaction involves an increase in carbon oxidation state of +2 (from ground state zero to 2). In principle, such would affect the planning of the reaction, as one would have to consider not only the stoichiometry of the reductant but also the temperature of the reaction. When an excess of carbon is used, however, such concerns do not arise. It is therefore preferred to use an excess of carbon, and control the stoichiometry of the reaction with another of the starting materials as limiting reagent.

As noted above, the active material $A^1{}_aM^1{}_b(XY_4)_cZ_d$ can contain a mixture of alkali metals $A^1$, a mixture of metals $M^1$, a mixture of components Z, and a phosphate group representative of the $XY_4$ group in the formula. In another aspect of the invention, the phosphate group can be completely or partially substituted by a number of other $XY_4$ moieties, which will also be referred to as "phosphate replacements" or "modified phosphates". Thus, active materials are provided according to the invention wherein the $XY_4$ moiety is a phosphate group that is completely or partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3}$, and $(PS_4)^{3-}$. They are most conveniently available as the sodium, lithium, or potassium derivative.

To synthesize the active materials containing the modified phosphate moieties, it is usually possible to substitute all or part of the phosphate compounds discussed above with a source of the replacement anion. The replacement is considered on a stoichiometric basis and the starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or the mixed metal $M^1$ may be a part of the modified phosphate compound.

Non-limiting examples of sources of monofluoromonophosphates include $Na_2PO_3F$, $K_2PO_3F$, $(NH_4)_2PO_3F.H_2O$, $LiNaPO_3F.H_2O$, $LiKPO_3F$, $LiNH_4PO_3F$, $NaNH_4PO_3F$, $NaK_3(PO_3F)_2$ and $CaPO_3F.2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially or completely substitute phosphorous in the active materials for silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like and pyrocenes represented by the formula $[(SiO_3)^{2-}]_n$, for example $LiAl(SiO_3)_2$. Silica or $SiO_2$ may also be used.

Representative arsenate compounds that may be used to prepare the active materials of the invention include $H_3AsO_4$ and salts of the anions $[H_2AsO_4]^-$ and $HAsO_4]^{2-}$. Sources of antimonate in the active materials can be provided by antimony-containing materials such as $Sb_2O_5$, $M^ISbO_3$ where $M^I$ is a metal having oxidation state +1, $M^{III}SbO_4$ where $M^{III}$ is a metal having an oxidation state of +3, and $M^{II}Sb_2O_7$ where $M^{II}$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

In general, any anion may be combined with the alkali metal cation to provide the alkali metal source starting material, or with a metal $M^1$ cation to provide a metal starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to the formation of volatile by-products during the solid state reaction. Thus, it is desirable to choose ammonium salts, carbonates, bicarbonates, oxides, hydroxides, and the like where possible. Starting materials with these counterions tend to form volatile by-products such as water, ammonia, and carbon dioxide, which can be readily removed from the reaction mixture. Similarly, sulfur-containing anions such as sulfate, bisulfate, sulfite, bisulfite and the like tend to result in volatile sulfur oxide by-products. Nitrogen-containing anions such as nitrate and nitrite also tend to give volatile $NO_x$ by-products.

As noted above, the reactions may be carried out without reduction, or in the presence of a reductant. In one aspect, the reductant, which provides reducing power for the reactions, may be provided in the form of a reducing carbon by including a source of elemental carbon along with the other particulate starting materials. In this case, the reducing power is provided by simultaneous oxidation of carbon to either carbon monoxide or carbon dioxide.

The starting materials containing transition metal compounds are mixed together with carbon, which is included in an amount sufficient to reduce the metal ion of one or more of the metal-containing starting materials without full reduction to an elemental metal state. (Excess quantities of the reducing carbon may be used to enhance product quality.) An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. In a preferred embodiment, the carbon present during compound formation is intimately dispersed throughout the precursor and product. This provides many advantages, including the enhanced conductivity of the product. In a preferred embodiment, the presence of carbon particles in the starting materials also provides nucleation sites for the production of the product crystals.

Alternatively or in addition, the source of reducing carbon may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include pyrolization, carbonization, coking, destructive distillation, and the like. These process names, as well as the term thermal decomposition, are used interchangeably in this application to refer to the process by which a decomposition product capable of acting as a reductant is formed upon heating of a reaction mixture containing an organic material.

A typical decomposition product contains carbonaceous material. During reaction in a preferred embodiment, at least a portion of the carbonaceous material formed participates as a reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction.

In a preferred embodiment, some of the organic material providing reducing power is oxidized to a non-volatile component, such as for example, oxygen-containing carbon materials such as alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will preferably be enriched in carbon relative to the mole percent carbon present in the organic material. The carbonaceous material preferably contains from about 50 up to about 100 mole percent carbon.

While in some embodiments the organic precursor material forms a carbonaceous decomposition product that acts as a reductant as discussed above with respect to elemental carbon, in other embodiments a portion of the organic material may participate as reductant without first undergoing a decomposition. The invention is not limited by the exact mechanism or mechanisms of the underlying reduction processes.

As with elemental carbon, reactions with the organic precursor material are conveniently carried out by combining starting materials and heating. The starting materials include at least one transition metal compound as noted above. For convenience, it is preferred to carry out the decomposition of the organic material and the reduction of a transition metal in one step. In this embodiment, the organic material decomposes in the presence of the transition metal compound to form a decomposition product capable of acting as a reductant, which reacts with the transition metal compound to form a reduced transition metal compound. In another embodiment, the organic material may be decomposed in a separate step to form a decomposition product The decomposition product may then be combined with a transition metal compound to form a mixture. The mixture may then be heated for a time and at a temperature sufficient to form a reaction product comprising a reduced transition metal compound.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as halogens, oxygen, nitrogen, phosphorus, and sulfur, may be present in the organic material, as long as they do not significantly interfere with the decomposition process or otherwise prevent the reductions from being carried out. Precursors include organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include starch, cellulose, and their ether or ester derivatives. Other derivatives include the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m (H_2O)_n$, where m and n are integers. For simple hexose or pentose sugars, m and n are equal to each other. Examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ include ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include sucrose, maltose, lactose, trehalose, gentiobiose, cellobiose, and melibiose. Three-ring (trisaccharides such as raffinose) and higher oligomeric and polymer carbohydrates may also be used. Examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as glycerol, sorbitol, mannitol, iditol, dulcitol, talitol, arabitol, xylitol, and adonitol, as well as "slightly oxidized" carbohydrates such as gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150-180° C. Preferably, the liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The reaction proceeds with carbothermal reduction. The liquid precursor materials may also advantageously serve or function as a binder in the starting material mixture as noted above.

Reducing carbon is preferably used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including polyethylenes, polypropylenes, polystyrenes, polybutadienes, and the like, Depending on the degree of unsaturation, the equivalent weight may be slightly above or below 14.

For organic materials having elements other than carbon and hydrogen, the equivalent weight for the purpose of calculating a stoichiometric quantity to be used in the reactions is generally higher than 14. For example, in carbohydrates it is about 30 g/equivalent. Examples of carbohydrates include sugars such as glucose, fructose, and sucrose, as well as polymers such as cellulose and starch.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air) may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

In a preferred embodiment, reduction is carried out in a reducing atmosphere in the presence of a reductant as discussed above. The term "reducing atmosphere" as used herein means a gas or mixture of gases that is capable of providing reducing power for a reaction that is carried out in the atmosphere. Reducing atmospheres preferably contain one or more so-called reducing gases. Examples of reducing gases include hydrogen, carbon monoxide, methane, and ammonia, as well as mixtures thereof. Reducing atmospheres also preferably have little or no oxidizing gases such as air or oxygen. If any oxidizing gas is present in the reducing atmosphere, it is preferably present at a level low enough that it does not significantly interfere with any reduction processes taking place.

The stoichiometry of the reduction can be selected along with the relative stoichiometric amounts of the starting components $A^1$, $M^1$, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon or an organic material, any excess reducing agent does not present a problem. In the former case, the gas is volatile and is easily separated from the reaction mixture, while in the latter, the excess carbon in the reaction product does not harm the properties of the active material, particularly in embodiments where carbon is added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

When using a reducing atmosphere, it is difficult to provide less than an excess of reducing gas such as hydrogen. Under such as a situation, it is preferred to control the stoichiometry of the reaction by the other limiting reagents. Alternatively the reduction may be carried out in the presence of reducing carbon such as elemental carbon. Experimentally, it would be possible to use precise amounts of reductant carbon to make products of a chosen stoichiometry. However, it is preferred to carry out the carbothermal reduction in a molar excess of carbon. As with the reducing atmosphere, this is easier to do experimentally, and it leads to a product with excess carbon dispersed into the reaction product, which as noted above provides a useful active electrode material.

Before reacting the mixture of starting materials, the particles of the starting materials are intermingled. Preferably, the starting materials are in particulate form, and the intermingling results in an essentially homogeneous powder mixture of the precursors. In one embodiment, the precursor powders are dry-mixed using, for example, a ball mill. Then the mixed powders are pressed into pellets. In another embodiment, the precursor powders are mixed with a binder. The binder is preferably selected so as not to inhibit reaction between particles of the powders. Preferred binders decompose or evaporate at a temperature less than the reaction temperature. Examples include mineral oils, glycerol, and polymers that decompose or carbonize to form a carbon residue before the reaction starts, or that evaporate before the reaction starts. In one embodiment, the binders used to hold the solid particles also function as sources of reducing carbon, as described above. In still another embodiment, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials include a reducing agent, the reaction product is a transition metal compound having at least one transition metal in a lower oxidation state relative to its oxidation state in the starting materials.

Preferably, the particulate starting materials are heated to a temperature below the melting point of the starting materials. Preferably, at least a portion of the starting material remains in the solid state during the reaction.

The temperature should preferably be about 400° C. or greater, and desirably about 450° C. or greater, and preferably about 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than about 600° C.; most desirably greater than about 650° C.; preferably about 700° C. or greater; more preferably about 750° C. or greater. Suitable ranges for many reactions are from about 700 to about 950C, or from about 700 to about 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than about 1200° C. are not thought to be needed.

In one embodiment, the methods of this invention utilize the reducing capabilities of carbon in a unique and controlled manner to produce desired products having structure and alkali metal content suitable for use as electrode active materials. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state.

Referring back to the discussion of temperature, at about 700° C. both the carbon to carbon monoxide and the carbon to carbon dioxide reactions are occurring. At closer to about 600° C. the C to $CO_2$ reaction is the dominant reaction. At closer to about 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a preheated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

After reaction, the products are preferably cooled from the elevated temperature to ambient (room) temperature (i.e., about 10° C. to about 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

The general aspects of the above synthesis routes are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

In a preferred embodiment, a two-step method is used to prepare the general formula $Li_{1+d}MPO_4F_d$ which consists of the initial preparation of a $LiMPO_4$ compound (step 1), which is then reacted with x moles of LiF to provide $Li_2 MPO_4F$ (step 2). The starting (precursor) materials for the first step include a lithium containing compound, a metal containing compound and a phosphate containing compound. Each of these compounds may be individually available or may be incorporated within the same compounds, such as a lithium metal compound or a metal phosphate compound.

Following the preparation in step one, step two of the reaction proceeds to react the lithium metal phosphate (provided in step 1) with a lithium salt, preferably lithium fluoride (LiF). The LiF is mixed in proportion with the lithium metal phosphate to provide a lithiated transition metal fluorophosphate product. The lithiated transition metal fluorophosphate has the capacity to provide lithium ions for electrochemical potential.

In addition to the previously described two-step method, a one step reaction method may be used in preparing such preferred materials of the present invention. In one method of this invention, the starting materials are intimately mixed and then reacted together when initiated by heat. In general, the mixed powders are pressed into a pellet. The pellet is then heated to an elevated temperature. This reaction can be run under an air atmosphere or a non-oxidizing atmosphere. In another method, the lithium metal phosphate compound used as a precursor for the lithiated transition metal fluorophosphate reaction can be formed either by a carbothermal reaction, or by a hydrogen reduction reaction.

The general aspects of the above synthesis route are applicable to a variety of starting materials. The metal compounds may be reduced in the presence of a reducing agent, such as hydrogen or carbon. The same considerations apply to other metal and phosphate containing starting materials. The thermodynamic considerations such as ease of reduction of the selected starting materials, the reaction kinetics, and the melting point of the salts will cause adjustment in the general procedure, such as the amount of reducing agent, the temperature of the reaction, and the dwell time.

The first step of a preferred two-step method includes reacting a lithium containing compound (lithium carbonate, $Li_2CO_3$), a metal containing compound having a phosphate group (for example, nickel phosphate, $Ni_3(PO_4)_2 \cdot xH_2O$, which usually has more than one mole of water), and a phosphoric acid derivative (such as a diammonium hydrogen phosphate, DAHP). The powders are pre-mixed with a mortar and pestle until uniformly dispersed, although various methods of mixing may be used. The mixed powders of the starting materials are pressed into pellets. The first stage reaction is conducted by heating the pellets in an oven at a preferred heating rate to an elevated temperature, and held at such elevated temperature for several hours. A preferred ramp rate of about 2° C./minute is used to heat to a preferable temperature of about 800° C. Although in many instances a heating rate is desirable for a reaction, it is not always necessary for the success of the reaction. The reaction is carried out under a flowing air atmosphere (e.g., when M is Ni or Co), although the reaction could be carried out in an inert atmosphere such as $N_2$ or Ar (when M is Fe). The flow rate will depend on the size of the oven and the quantity needed to maintain the atmosphere. The reaction mixture is held at the elevated temperature for a time sufficient for the reaction product to be formed. The pellets are then allowed to cool to ambient temperature. The rate at which a sample is cooled may vary.

In the second step, the $Li_2 MPO_4F$ active material is prepared by reacting the $LiMPO_4$ precursor made in step one with a lithium salt, preferably lithium fluoride LiF. Alternatively, the precursors may include a lithium salt other than a halide (for example, lithium carbonate) and a halide material other than lithium fluoride (for example ammonium fluoride). The precursors for step 2 are initially pre-mixed using a mortar and pestle until uniformly dispersed. The mixture is then pelletized, for example by using a manual pellet press and an approximate 1.5" diameter die-set. The resulting pellet is preferably about 5 mm thick and uniform. The pellets are then transferred to a temperature-controlled tube furnace and heated at a preferred ramp rate of about 2° C./minute to an ultimate temperature of about 800° C. The entire reaction is conducted in a flowing argon gas atmosphere. Prior to being removed from the box oven, the pellet is allowed to cool to room temperature. As stated previously, the rate in which the pellet is cooled does not seem to have a direct impact on the product.

An alternate embodiment of the present invention is the preparation of a mixed metal-lithium fluorophosphate compound. The two stage reaction results in the general nominal formula $Li_2M'_{1-m}M''_mPO_4F$ wherein $0 \leq m < 1$. In general, a lithium or other alkali metal compound, at least two metal compounds, and a phosphate compound are reacted together in a first step to provide a lithium mixed metal phosphate precursor. As previously described in other reactions, the powders are mixed together and pelletized. The pellet is then transferred to a temperature-controlled tube furnace equipped with a flowing inert gas (such as argon). The sample is then heated for example at a ramp rate of about 2° C./minute to an ultimate temperature of about 750° C. and maintained at this temperature for eight hours or until a reaction product is formed. As can be seen in various examples, the specific temperatures used vary depending on what initial compounds were used to form the precursor, but the standards described in no way limit the application of the present invention to various compounds. In particular, a high temperature is desirable due to the carbothermal reaction occurring during the formation of the precursor. Following the heating of the pellet for a specified period of time, the pellet was cooled to room temperature.

The second stage provides the reaction of the lithium mixed metal phosphate compound with an alkali metal halide such as lithium fluoride. Following the making of the pellet from the lithium mixed metal phosphate precursor and the lithium fluoride, the pellet is placed inside a covered and sealed nickel crucible and transferred to a box oven. In general, the nickel crucible is a convenient enclosure for the pellet although other suitable containers, such as a ceramic crucible, may also be used. The sample is then heated rapidly to an ultimate temperature of about 700° C. and maintained at this temperature for about 15 minutes. The crucible is then removed from the box oven and cooled to room temperature. The result is a lithiated transition metal fluorophosphate compound of the present invention.

In addition to the general nominal formula $Li_2M'_{1-m}M''_mPO_4F$, a non-stoichiometric mixed metal lithium fluorophosphate having the general nominal formula $Li_{1+d}M'_{1-m}M''_mPO_4F_d$ is further provided. The same conditions are met when preparing the non-stoichiometric formula as are followed when preparing the stoichiometric formula. In the non-stoichiometric mixed metal lithium fluorophosphate, the mole ratio of lithiated transition metal phosphate precursor to lithium fluoride is about 1.0 to 0.25. The precursor compounds are pre-mixed using a mortar and pestle and then pelletized. The pellet is then placed inside a covered and sealed crucible and transferred to a box oven. The sample is rapidly heated to an ultimate temperature of about 700° C. and maintained at this temperature for about 15 minutes. Similar conditions apply when preparing the nominal general formula $Li_{1+d}MPO_4F_d$.

Referring back to the discussion of the lithium fluoride and metal phosphate reaction, the temperature of reaction is preferably about 400° C. or higher but below the melting point of the metal phosphate, and more preferably at about 700° C. It is preferred to heat the precursors at a ramp rate in a range from a fraction of a degree to about 10° C. per minute and preferably about 2° C. per minute. Once the desired temperature is attained, the reactions are held at the reaction temperature from about 10 minutes to several hours, depending on the reaction temperature chosen. The heating may be conducted under an air atmosphere, or if desired may be conducted under a non-oxidizing or inert atmosphere. After reaction, the products are cooled from the elevated temperature to ambient (room) temperature (i.e. from about 10° C. to about 40° C.). Desirably, the cooling occurs at a rate of about 50° C./minute. Such cooling has been found to be adequate to achieve the desired structure of the final product in some cases. It is also possible to quench the products at a cooling rate on the order of about 100° C./minute. In some instances, such rapid cooling may be preferred. A generalized rate of cooling has not been found applicable for certain cases, therefore the suggested cooling requirements vary.

Method of Manufacturing $A'_eM'_fO_g$:

The alkali metal transition metal oxide, denoted by the formula $A'_eM'_fO_g$, is prepared by reacting an alkali metal (A') containing compound and a transition metal (M') containing compound. The sources of A' and M' may be reacted together in a solid state while heating for a time and temperature sufficient to make a reaction product. The starting material are provided in powder or particulate form The powders are mixed together with any of a variety of procedures, such as by ball milling without attrition, blending in a mortar and pestle, and the like. Thereafter the mixture of powdered starting materials is compressed into a tablet and/or held together with a binder material to form a closely cohering reaction mixture. The reaction mixture is heated in an oven, generally at a temperature of about 400° C. or greater until a reaction product forms.

Method of Manufacturing Modified Manganese Oxide ($A^3{}_hMn_tO_4$):

The modified $A^3{}_hMn_tO_4$ compound is prepared by reacting cubic spinel manganese oxide particles and particles of a alkali metal compound in air for a time and at a temperature sufficient to decompose at least a portion of the compound, providing a treated lithium manganese oxide. The reaction product is characterized as particles having a core or bulk structure of cubic spinel lithium manganese oxide and a surface region which is enriched in $Mn^{+4}$ relative to the bulk. X-ray diffraction data and x-ray photoelectron spectroscopy data are consistent with the structure of the stabilized LMO being a central bulk of cubic spinel lithium manganese oxide with a surface layer or region comprising $A_2MnO_3$, where A is an alkali metal.

For a treated lithium manganese oxide, a method of preparing comprises first forming a mixture of the lithium manganese oxide (LMO) particles and an alkali metal compound. Next, the mixture is heated for a time and at a temperature sufficient to decompose at least a portion of the alkali metal compound in the presence of a lithium manganese oxide.

The mixture may be formed in a number of ways. Preferred methods of mixing result in very well-mixed starting materials. For example, in one embodiment, powders of the LMO and the alkali metal compound are milled together without attrition. In another, the powders can be mixed with a mortar and pestle. In another embodiment, the LMO powder may be combined with a solution of the alkali metal compound prior to heating.

The mixture preferably contains less than 50% by weight of the alkali metal compound, preferably less than about 20%. The mixture contains at least about 0.1% by weight of the alkali metal compound, and preferably 1% by weight or more. In a preferred embodiment, the mixture contains from about 0.1% to about 20%, preferably from about 0.1% to about 10%, and more preferably from about 0.4% to about 6% by weight of the alkali metal compound.

The alkali metal compound is a compound of lithium, sodium, potassium, rubidium or cesium. The alkali metal compound serves as a source of alkali metal ion in particulate form. Preferred alkali metal compounds are sodium compounds and lithium compounds. Examples of compounds include, without limitation, carbonates, metal oxides, hydroxides, sulfates, aluminates, phosphates and silicates. Examples of lithium compounds thus include, without limitation, lithium carbonates, lithium metal oxides, lithium mixed metal oxides, lithium hydroxides, lithium aluminates, and lithium silicates, while analogous sodium compounds are also preferred. A preferred lithium compound is lithium carbonate, which decomposes in the presence of LMO at a temperature in a range of 600° C. to 750° C. Likewise, sodium carbonate and sodium hydroxide are preferred sodium compounds. Depending on the temperature selected, a portion of the alkali metal compound is decomposed or reacted with the lithium manganese oxide and a portion of the alkali metal compound is dispersed on the surface of the lithium manganese oxide particles. The result is a treated spinel lithium manganese oxide characterized by reduced surface area and increased alkali metal content as compared to an untreated spinel lithium manganese oxide. In one alternative, essentially all of a lithium or sodium compound is decomposed or reacted with the lithium manganese oxide.

In one aspect, the heating is conducted in an air atmosphere or in a flowing air atmosphere. In one embodiment, the heating is conducted in at least two stages beginning at an elevated temperature, followed by cooling to an ambient temperature. In one example, three progressive stages of heating are conducted. As an example, a first stage is in a range of about 650 to 700° C., a second stage is at a lower temperature on the order of 600° C., and a third stage is at a lower temperature in a range of about 400 to 500° C., followed by permitting the product to cool to an ambient condition. Quenching is considered optional. The heating is conducted for a time up to about 10 hours.

In another non-limiting example, two stages of heating may be used, for example by first heating in a first furnace at a temperature of about 600-750° C. for about 30 minutes, then removing the material to a second furnace set a about 450° C. for about one hour, ensuring that the second furnace has a good supply of flowing air, and finally removing the material from the second furnace to allow it to cool. Single stage heating may also be used. For example, the mixture may be heated in a single box furnace set at about 650° C. for about 30 minutes. Thereafter, the furnace may be turned off and the material allowed to cool in the furnace while ensuring there is a good supply of flowing air throughout.

In another alternative, the heating and cooling may be conducted in a Multiple Heat Zone Rotary Furnace. Here, the material is fed into the hottest part of the furnace, typically at 650-750° C. Then, the material travels through the furnace to another heat zone at a lower temperature, for example, 600° C. Then the material progress to a zone at 400° C. to 450° C., and finally is allowed to cool to room temperature. A good supply of flowing air is provided throughout the furnace.

The product of the aforesaid method is a composition comprising particles of spinel lithium manganese oxide (LMO) enriched with alkali metal by a decomposition product of the alkali metal compound forming a part of each of the LMO particles. The product is preferably characterized by having a reduced surface area and improved capacity retention with cycling, expressed in milliamp hours per gram as compared to the initial, non-modified spinel. In one aspect, the decomposition product is a reaction product of the LMO particles and the alkali metal compound. For the case where the alkali metal is lithium, a lithium-rich spinel is prepared that can be represented by the formula $Li_{1+x}Mn_{2-x}O_4$ where x is greater than zero and less than or equal to about 0.20. Preferably x is greater than or equal to about 0.081. This lithium-rich spinel product is preferably prepared from a starting material of the formula $Li_{1+x}Mn_{2-x}O_4$ where $0 \leq x \leq 0.08$, and preferably the starting material has x greater than 0.05. The lithium-rich spinel product has an Li content greater than that of the LMO starting material.

The product of the aforesaid method will depend upon the extent of heating during heat treatment. If all the alkali metal compound is decomposed or reacted, then the alkali metal enriched spinel is produced. If some of the alkali metal compound (for example, lithium carbonate or sodium carbonate) remains unreacted or not decomposed, then it is dispersed on and adhered to the surface of the alkali metal enriched spinel particles.

Once each of the active materials are formed, proportions are combined in a powder mixture. Each active material is physically combined together to form a homogenous mixtures containing relative proportion of active materials.

Electrodes:

The present invention also provides electrodes comprising an electrode active material blend of the present invention. In a preferred embodiment, the electrodes of the present invention comprise an electrode active material mixture of this invention, a binder; and an electrically conductive carbonaceous material.

In a preferred embodiment, the electrodes of this invention comprise:

(a) from about 25% to about 95%, more preferably from about 50% to about 90%, active material blend;

(b) from about 2% to about 95% electrically conductive material (e.g., carbon black); and (c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries:

The batteries of the present invention comprise:

(a) a first electrode comprising an active material of the present invention;

(b) a second electrode which is a counter-electrode to said first electrode; and (c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:

(a) from about 0% to about 95%, preferably from about 25% to about 95%, more preferably from about 50% to about 90%, of an insertion material;

(b) from about 2% to about 95% electrically conductive material (e.g., carbon black); and (c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof, In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where $0<m<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

In one embodiment, batteries are provided wherein one of the electrodes contains an active material and optionally mixed with a basic compound as described above, wherein the battery further contains somewhere in the system a basic compound that serves to neutralize the acid generated by decomposition of the electrolyte or other components. Thus, a basic compound such as but not limited to those discussed above, may be added to the electrolyte to form a battery having increased resistance to breakdown over multiple charge/recharge cycles.

The batteries of this invention also comprise a suitable electrolyte that provides a physical separation but allows transfer of ions between the cathode and anode. The electrolyte is preferably a material that exhibits high ionic conductivity, as well as having insular properties to prevent self-discharging during storage. The electrolyte can be either a liquid or a solid. A liquid electrolyte comprises a solvent and an alkali metal salt that together form an ionically conducting liquid. So called "solid electrolytes" contain in addition a matrix material that is used to separate the electrodes.

One preferred embodiment is a solid polymeric electrolyte, made up of a solid polymeric matrix and a salt homogeneously dispersed via a solvent in the matrix. Suitable solid polymeric matrices include those well known in the art and include solid matrices formed from organic polymers, inorganic polymers or a solid matrix-forming monomer and from partial polymers of a solid matrix forming monomer.

In another variation, the polymer, solvent and salt together form a gel which maintains the electrodes spaced apart and provides the ionic conductivity between electrodes. In still another variation, the separation between electrodes is provided by a glass fiber mat or other matrix material and the solvent and salt penetrate voids in the matrix.

Preferably, the salt of the electrolyte is a lithium or sodium salt. Such salts among those useful herein include $LiAsF_6$, $LiPF_6$, $LiClO_4$, $LiB(C_6H_5)_4$, $LiAlCl_4$, LiBr, $LiBF_4$, $LiSO_3CF_3$, $LiN(SO_2CF_3)_2$, $LiN(SO_2C_2F_5)_2$, and mixtures thereof, as well as sodium analogs, with the less toxic salts being preferable. The salt content is preferably from about 5% to about 65%, preferably from about 8% to about 35% (by weight of electrolyte). A preferred salt is $LiBF_4$. In a preferred embodiment, the $LiBF_4$ is present at a molar concentration of from 0.5M to 3M, preferably 1.0M to 2.0M, and most preferably about 1.5M.

Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1998; U.S. Pat. No. 5,851,504, Barker et al., issued Dec. 22, 1998; U.S. Pat. No. 6,020,087, Gao, issued Feb. 1, 2000; U.S. Pat. No. 6,103,419, Saidi et al., issued Aug. 15, 2000; and PCT Application WO 01/24305, Barker et al., published Apr. 5, 2001; all of which are incorporated by reference herein.

The solvent is preferably a low molecular weight organic solvent added to the electrolyte, which may serve the purpose of solvating the inorganic ion salt. The solvent is preferably a compatible, relatively non-volatile, aprotic, polar solvent. Examples of solvents among those useful herein include chain carbonates such as dimethyl carbonate (DMC), diethyl carbonate (DEC), dipropylcarbonate (DPC), and ethyl methyl carbonate (EMC); cyclic carbonates such as ethylene carbonate (EC), propylene carbonate (PC) and butylene carbonate; ethers such as diglyme, triglyme, and tetraglyme; lactones; esters, dimethylsulfoxide, dioxolane, sulfolane, and mixtures thereof. Examples of pairs of solvent include EC/DMC, EC/DEC, EC/DPC and EC/EMC.

In a preferred embodiment, the electrolyte solvent contains a blend of two components. The first component contains one or more carbonates selected from the group consisting of alkylene carbonates (cyclic carbonates), having a preferred ring size of from 5 to 8, $C_1$-$C_6$ alkyl carbonates, and mixtures thereof. The carbon atoms of the alkylene carbonates may be optionally substituted with alkyl groups, such as $C_1$-$C_6$ carbon chains. The carbon atoms of the alkyl carbonates may be optionally substituted with $C_1$-$C_4$ alkyl groups. Examples of unsubstituted cyclic carbonates are ethylene carbonate (5-membered ring), 1,3-propylene carbonate (6-membered ring), 1,4-butylene carbonate (7-membered ring), and 1,5-pentylene carbonate (8-membered ring). Optionally the rings may be substituted with lower alkyl groups, preferably methyl, ethyl, propyl, or isopropyl groups. Such structures are well known; examples include a methyl substituted 5-membered ring (also known as 1,2-propylene carbonate, or simply propylene carbonate (PC)), and a dimethyl substituted 5-membered ring carbonate (also known as 2,3-butylene carbonate) and an ethyl substituted 5-membered ring (also known as 1,2-butylene carbonate or simply butylene carbonate (BC). Other examples include a wide range of methylated, ethylated, and propylated 5-8 membered ring carbonates. Preferred alkyl carbonates include diethyl carbonate, methyl ethyl carbonate, dimethyl carbonate and mixtures thereof. DMC is a particularly preferred alkyl carbonate. In a preferred embodiment, the first component is a 5- or 6-membered alkylene carbonate. More preferably, the alkylene carbonate has a 5-membered ring. In a particularly preferred embodiment, the first component comprises ethylene carbonate.

The second component in a preferred embodiment is selected from the group of cyclic esters, also known as lactones. Preferred cyclic esters include those with ring sizes of 4 to 7. The carbon atoms in the ring may be optionally substituted with alkyl groups, such as $C_1$-$C_6$ chains. Examples of unsubstituted cyclic esters include the 4-membered β-propiolactone (or simply propiolactone); γ-butyrolactone (5-membered ring), δ-valerolactone (6-membered ring) and ε-caprolactone (7-membered ring). Any of the positions of the cyclic esters may be optionally substituted, preferably by methyl, ethyl, propyl, or isopropyl groups. Thus, preferred second components include one or more solvents selected from the group of unsubstituted, methylated, ethylated, or propylated lactones selected from the group consisting of propiolacone, butyrolactone, valerolactone, and caprolactone. (It will be appreciated that some of the alkylated derivatives of one lactone may be named as a different alkylated derivative of a different core lactone. To illustrate, γ-butyrolactone methylated on the γ-carbon may be named as γ-valerolactone.)

In a preferred embodiment, the cyclic ester of the second component has a 5- or a 6-membered ring. Thus, preferred second component solvents include one or more compounds selected from γ-butyrolactone (gamma-butyrolactone), and δ-valerolactone, as well as methylated, ethylated, and propylated derivatives. Preferably, the cyclic ester has a 5-membered ring. In a particular preferred embodiment, the second component cyclic ester comprises γ-butyrolactone.

The preferred two component solvent system contains the two components in a weight ratio of from about 1:20 to a ratio of about 20:1. More preferably, the ratios range from about 1:10 to about 10:1 and more preferably from about 1:5 to about 5:1. In a preferred embodiment the cyclic ester is present in a higher amount than the carbonate. Preferably, at least about 60% (by weight) of the two component system is made up of the cyclic ester, and preferably about 70% or more. In a particularly preferred embodiment, the ratio of cyclic ester to carbonate is about 3 to 1 In one embodiment, the solvent system is made up essentially of γ-butyrolactone and ethylene carbonate. A preferred solvent system thus contains about 3 parts by weight γ-butyrolactone and about 1 part by weight ethylene carbonate. The preferred salt and solvent are used together in a preferred mixture comprising about 1.5 molar $LiBF_4$ in a solvent comprising about 3 parts γ-butyrolactone and about 1 part ethylene carbonate by weight.

A separator allows the migration of ions while still providing a physical separation of the electric charge between the electrodes, to prevent short-circuiting. The polymeric matrix itself may function as a separator, providing the physical isolation needed between the anode and cathode. Alternatively, the electrolyte can contain a second or additional polymeric material to further function as a separator. In a preferred embodiment, the separator prevents damage from elevated temperatures within the battery that can occur due to uncontrolled reactions preferably by degrading upon high temperatures to provide infinite resistance to prevent further uncontrolled reactions.

The separator membrane element is generally polymeric and prepared from a composition comprising a copolymer. A preferred composition contains a copolymer of about 75% to about 92% vinylidene fluoride with about 8% to about 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption. In a non-limiting example, a preferred electrolyte separator contains about two parts polymer per one part of fumed silica.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab, for a description of tabs and collectors. Such structures are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120-160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, a electrode membrane comprising the electrode active material (e.g., an insertion material such as carbon or graphite or a insertion compound) dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1990; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Aug. 26, 1997; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. No. 5,418, 091, Gozdz et al., issued May 23, 1995; U.S. Pat. No. 5,460, 904, Gozdz et al., issued Oct. 24, 1995; U.S. Pat. No. 5,456, 000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

The description of the invention is merely exemplary in nature and, thus, variations that do not depart from the gist of the invention are intended to be within the scope of the invention. Such variations are not to be regarded as a departure from the spirit and scope of the invention.

The following are examples of the present invention but in no way limit the scope of the present invention.

EXAMPLE 1

A blend of the present invention comprising $LiFe_{0.9}Mg_{0.1}PO_4$ and $LiCoO_2$ is made as follows. Each of the active materials are made individually and then combined to form a blend of active material particles for use in an electrode.

(a) The first active material $LiFe_{0.9}Mg_{0.1}PO_4$ is made as follows. The following sources containing Li, Fe, Mg, and phosphate are provided containing the respective elements in a molar ratio of 1.0:0.9:0.1:1.0.

| | |
|---|---|
| 0.50 moles $Li_2CO_3$ (mol. wt. 73.88 g/mol), 1.0 mol Li | 36.95 g |
| 0.45 mol $Fe_2O_3$ (159.7 g/mol), 0.9 mol Fe | 71.86 g |
| 0.10 moles $Mg(OH)_2$ (58 g/mol), 0.1 mol Mg | 5.83 g |
| 1.00 moles $(NH_4)_2HPO_4$ (132 g/mol), 1.0 mol phosphate | 132.06 g |
| 0.45 moles elemental carbon (12 g/mol) (=100% mass excess) | 5.40 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(b) The second active material $LiCoO_2$ is made as follows or can be obtained commercially. The following sources containing Li, Co, and oxygen are provided containing the respective elements in a molar ratio of 1.0:1.0:2.0.

| | |
|---|---|
| 0.50 moles $Li_2CO_3$ (mol. wt. 73.88 g/mol), 1.0 mol Li | 36.95 g |
| 1.0 moles CoCo3 (118.9 g/mol), 1.0 mol Co | 118.9 g |

The above starting materials are combined and ball milled to mix the particles. Thereafter, the particle mixture is pelletized. The pelletized mixture is calcined for 4-20 hours, most preferably 5-10 at 900° C. in an oven. The sample is removed from the oven and cooled.

The first active material $LiFe_{0.9}Mg_{0.1}PO_4$ and second active material $LiCoO_2$ are physically combined in a 67.5/32.5 weight percent mixtures respectively.

An electrode is made with 80% of the active material, 10% of Super P conductive carbon, and 10% poly vinylidene difluoride. A cell with that electrode as cathode and a carbon intercalation anode is constructed with an electrolyte comprising 1M $LiBF_4$ dissolved in a 3:1 mixture by weight of γ-butyrolactone:ethylene carbonate.

In the foregoing Example, $LiCo_{0.8}Fe_{0.1}Al_{0.025}Mg_{0.05}PO_{3.975}F_{0.025}$ can be substituted for $LiFe_{0.9}Mg_{0.1}PO_4$ with substantially equivalent results.

EXAMPLE 2

A blend of the present invention comprising $LiCo_{0.8}Fe_{0.1}Al_{0.025}Mg_{0.05}PO_{3.975}F_{0.025}$ and $LiFe_{0.95}Mg_{0.05}PO_4$ is made as follows. Each of the active materials are made individually and then combined to form a blend of active material particles for use in an electrode.

(a) The first active material $LiCo_{0.8}Fe_{0.1}Al_{0.025}Mg_{0.05}PO_{3.975}F_{0.025}$ is made as follows. The following sources containing Li, Co, Fe, Al, Mg, phosphate, and fluoride are provided containing the respective elements in a molar ratio of 1.0:0.8:0.1:0.025:0.05:1.0:0.025.

| | |
|---|---|
| 0.05 moles $Li_2CO_3$ (mol. wt. 73.88 g/mol), 0.1 mol Li | 3.7 g |
| 0.02667 moles $Co_3O_4$ (240.8 g/mol), 0.08 mol Co | 6.42 g |
| 0.005 moles $Fe_2O_3$ (159.7 g/mol), 0.01 mol Fe | 0.8 g |
| 0.0025 moles $Al(OH)_3$ (78 g/mol), 0.0025 mol Al | 0.195 g |
| 0.005 moles $Mg(OH)_2$ (58 g/mol), 0.005 mol Mg | 0.29 g |
| 0.1 moles $(NH_4)_2HPO_4$ (132 g/mol), 0.1 mol phosphate | 13.2 g |
| 0.00125 moles $NH_4HF_2$ (57 g/mol), 0.0025 mol F | 0.071 g |
| 0.2 moles elemental carbon (12 g/mol) (=100% mass excess) | 2.4 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(b) The second active material $LiFe_{0.95}Mg_{0.05}PO_4$ is made as follows. The following sources containing Li, Fe, Mg, and phosphate are provided containing the respective elements in a molar ratio of 1.0:0.95:0.05:1.0.

| | |
|---|---|
| 0.50 moles $Li_2CO_3$ (mol. wt. 73.88 g/mol), 1.0 mol Li | 36.95 g |
| 0.475 mol $Fe_2O_3$ (159.7 g/mol), 0.95 mol Fe | 75.85 g |
| 0.05 moles $Mg(OH)_2$ (58 g/mol), 0.05 mol Mg | 2.915 g |
| 1.00 moles $(NH_4)_2HPO_4$ (132 g/mol), 1.0 mol phosphate | 132.06 g |
| 0.45 moles elemental carbon (12 g/mol) (=100% mass excess) | 5.40 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(c) The first active material $LiCo_{0.8}Fe_{0.1}Al_{0.025}Mg_{0.05}PO_{3.975}F_{0.025}$ and second active material LiFe$_{0.95}$Mg$_{0.05}$PO$_4$ are physically combined in a 50/50 weight percent mixtures respectively.

An electrode is made with 80% of the active material, 10% of Super P conductive carbon, and 10% poly vinylidene difluoride. A cell with that electrode as cathode and a carbon intercalation anode is constructed with an electrolyte comprising 1M LiBF4 dissolved in a 3:1 mixture by weight of γ-butyrolactone:ethylene carbonate.

EXAMPLE 3

A blend of the present invention comprising LiFe$_{0.95}$Mg$_{0.05}$PO$_4$ and LiNi$_{0.75}$Co$_{0.25}$O$_2$ is made as follows. Each of the active materials are made individually and then combined to form a blend of active material particles for use in an electrode.

(a) The first active material LiFe$_{0.95}$Mg$_{0.05}$PO$_4$ is made as follows. The following sources containing Li, Fe, Mg, and phosphate are provided containing the respective elements in a molar ratio of 1.0:0.95:0.05:1.0.

| | |
|---|---|
| 0.50 moles Li$_2$CO$_3$ (mol. wt. 73.88 g/mol), 1.0 mol Li | 36.95 g |
| 0.95 mol FePO$_4$ ((150.82 g/mol), 0.95 mol Fe | 143.28 g |
| 0.05 moles Mg(OH)$_2$ (58 g/mol), 0.1 mol Mg | 2.915 g |
| 0.05 moles (NH$_4$)$_2$HPO$_4$ (132 g/mol), 0.05 mol phosphate | 0.33 g |
| 0.45 moles elemental carbon (12 g/mol) | 5.40 g |
| (=100% mass excess) | |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(b) The second active material LiNi$_{0.75}$Co$_{0.25}$O$_2$ is made as follows or can be commercially obtained. The following sources containing Li, Ni, Co, and oxygen are provided containing the respective elements in a molar ratio of 1.0:0.75:0.25:2.0.

| | |
|---|---|
| 0.50 moles Li$_2$CO$_3$ (73.88 g/mol), 1.0 mol Li | 36.95 g |
| 0.75 moles Ni(OH)$_2$ (92.71 g/mol), 0.75 mol Ni | 69.53 g |
| 0.25 moles CoCO$_3$ (118.9 g/mol), 0.25 mol Co | 29.73 g |

The above starting materials are combined and ball milled to mix the particles. Thereafter, the particle mixture is pelletized. The pelletized mixture is calcined for 4-20 hours, most preferably 5-10 at 900° C. in an oven. The sample is removed from the oven and cooled.

(c) The first active material LiFe$_{0.95}$Mg$_{0.05}$PO$_4$ and second active material LiNi$_{0.75}$CO$_{0.25}$O$_2$ are physically combined in a 67.5/32.5 weight percent mixtures respectively.

An electrode is made with 80% of the active material, 10% of Super P conductive carbon, and 10% poly vinylidene difluoride. A cell with that electrode as cathode and a carbon intercalation anode is constructed with an electrolyte comprising 1M LiBF$_4$ dissolved in a 3:1 mixture by weight of γ-butyrolactone:ethylene carbonate.

EXAMPLE 4

A blend of the present invention comprising LiFe$_{0.95}$Mg$_{0.05}$PO$_4$ and γ-LiV$_2$O$_5$ is made as follows. Each of the active materials are made individually and then combined to form a blend of active material particles for use in an electrode.

(a) The first active material LiFe$_{0.95}$Mg$_{0.05}$PO$_4$ is made as follows. The following sources containing Li, Fe, Mg, and phosphate are provided containing the respective elements in a molar ratio of 1.0:0.95:0.05:1.0.

| | |
|---|---|
| 0.50 moles Li$_2$CO$_3$ (mol. wt. 73.88 g/mol), 1.0 mol Li | 36.95 g |
| 0.95 mol FePO$_4$ (150.82 g/mol), 0.95 mol Fe | 143.28 g |
| 0.05 moles Mg(OH)$_2$ (58 g/mol), 0.1 mol Mg | 2.915 g |
| 0.05 moles (NH$_4$)$_2$HPO$_4$ (132 g/mol), 0.05 mol phosphate | 0.33 g |
| 0.45 moles elemental carbon (12 g/mol) | 5.40 g |
| (=100% mass excess) | |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(b) The second active material γ-LiV2O5 is made as follows. The following sources containing Li, V, and oxygen are provided containing the respective elements in a molar ratio of 1.0:2.0:5.0.

| | |
|---|---|
| 1.0 moles V$_2$O$_5$ (181.88 g/mol), 1.0 mol | 181.88 g |
| 0.5 moles Li$_2$CO$_3$ (92.71 g/mol), 0.5 mol Li | 36.95 g |
| 0.25 moles carbon (12 g/mol) (=25% mass excess) | 3.75 g |

The above starting materials are combined and ball milled to mix the particles. Thereafter, the particle mixture is pelletized. The pelletized mixture is heated in an inert atmosphere (i.e. argon) for 1-2 hours, most preferably around one hour at between 400-650° C., more preferably 600° C. in an oven. The sample is removed from the oven and cooled.

(c) The first active material LiFe$_{0.95}$Mg$_{0.05}$PO$_4$ and second active material γ-LiV$_2$O$_5$ are physically combined in a 67.5/32.5 weight percent mixtures respectively.

An electrode is made with 80% of the active material, 10% of Super P conductive carbon, and 10% poly vinylidene difluoride. A cell with that electrode as cathode and a carbon intercalation anode is constructed with an electrolyte comprising 1M LiBF$_4$ dissolved in a 3:1 mixture by weight of γ-butyrolactone:ethylene carbonate.

EXAMPLE 5

A blend of the present invention comprising LiFe$_{0.95}$Mg$_{0.05}$PO$_4$ and Li$_2$CuO$_2$ is made as follows. Each of the active materials are made individually and then combined to form a blend of active material particles for use in an electrode.

(a) The first active material LiFe$_{0.95}$Mg$_{0.05}$PO$_4$ is made as follows. The following sources containing Li, Fe, Mg, and phosphate are provided containing the respective elements in a molar ratio of 1.0:0.95:0.05:1.0.

| | |
|---|---|
| 1.0 moles LiH$_2$PO$_4$ (103.93 g/mol), 1.0 mol Li | 36.95 g |
| 0.475 mol Fe$_2$O$_3$ (159.7 g/mol), 0.95 mol Fe | 75.85 g |
| 0.05 moles Mg(OH)$_2$ (58 g/mol), 0.1 mol Mg | 2.915 g |
| 0.45 moles elemental carbon (12 g/mol) (=100% mass excess) | 5.40 g |

The above starting materials are combined and ball milled to mix the particles. Thereafter, the particle mixture is pelletized. The pelletized mixture is heated for 4-20 hours at 750° C. in an oven in an argon atmosphere. The sample is removed from the oven and cooled. An x-ray diffraction pattern shows that the material has an olivine type crystal structure.

(b) The second active material $Li_2CuO_2$ is made as follows. The following sources containing Li, Cu, and oxygen are provided containing the respective elements in a molar ratio of 2.0:1.0:2.0.

| | |
|---|---|
| 2.0 moles LiOH (23.948 g/mol), 2.0 mol Li | 47.896 g |
| 1.0 moles CuO (79.545 g/mol), 1.0 mol Cu | 79.545 g |

Prior to the mixing of the copper oxide with the lithium hydroxide, the lithium hydroxide salt is predried to about 120° C. for about 24 hours. The lithium salt is thoroughly ground, so that the particle size is approximately equivalent to the particle size of the copper oxide. The lithium hydroxide and copper oxide are mixed. Thereafter, the particle mixture is pelletized. The pelletized mixture is heated in an alumina crucible in an inert atmosphere at a rate of approximately 2° C./minute up to about 455° C. and is held at such temperature for approximately 12 hours. The temperature is ramped again at the same rate to achieve a temperature of 825° C. and then held at such temperature for approximately 24 hours. The sample is then cooled, and followed by a repeat heating for approximately 6 hours at 455° C., 6 hours at 650° C., and 825° C. for 12 hours.

(c) The first active material $LiFe_{0.95}Mg_{0.05}PO_4$ and second active material $Li_2CuO_2$ are physically combined in a 67.5/32.5 weight percent mixtures respectively.

An electrode is made with 80% of the active material, 10% of Super P conductive carbon, and 10% poly vinylidene difluoride. A cell with that electrode as cathode and a carbon intercalation anode is constructed with an electrolyte comprising 1M $LiBF_4$ dissolved in a 3:1 mixture by weight of γ-butyrolactone:ethylene carbonate.

In the foregoing Example, $LiCo_{0.8}Fe_{0.1}Al_{0.025}Mg_{0.05}PO_{3.975}F_{0.025}$ can be substituted for $LiFe_{0.95}Mg_{0.05}PO_4$ with substantially equivalent results.

What is claimed is:

1. A battery, comprising:
  a first electrode comprising two or more groups of particles having differing chemical compositions, wherein each group of particles comprises a material independently selected from the group consisting of:
  (a) materials of the formula $A^1_a M^1_b (XY_4)_c Z_d$;
  (b) materials of the formula $A^2_e M^2_f O_g$; and
  (c) materials of the formula $A^3_h Mn_i O_4$;
  wherein
    (i) $A^1$, $A^2$, and $A^3$ are independently selected from the group consisting of Li, Na, K, and mixtures thereof, and $0 < a \leq 8$, $0 < e \leq 6$;
    (ii) $M^1$ is one or more metals, comprising at least one metal which is capable of undergoing oxidation to a higher valence state, and $0.8 \leq b \leq 3$;
    (iii) $M^2$ is one or more metals, comprising at least one metal selected from the group consisting of Fe, Co, Ni, Mo, V, Zr, Ti, Mo, and Cr, and $1 \leq f \leq 6$;
    (iv) $XY_4$ is selected from the group consisting of $X'O_{4-x}Y'_x$, $X'O_{4-y}Y'_{2y}$, $X''S_4$, and mixtures thereof, where $X'$ is selected from the group consisting of P, As, Sb, Si, Ge, V, S, and mixtures thereof; $X''$ is selected from the group consisting of P, As, Sb, Si, Ge, V and mixtures thereof; $Y'$ is halogen; $0 \leq x < 3$; and $0 < y < 2$; and $0 < c \leq 3$;
    (v) Z is OH, a halogen, or mixtures thereof, and $0 \leq d \leq 6$; and
    (vi) $0 < g \leq 15$; and
    (vii) $M^1$, $M^2$, X, Y, Z, a, b, c, d, e, f, g, h, i, x and y are selected so as to maintain electroneutrality of each material;
  (b) the battery further comprising a second electrode which is a counter-electrode to the first electrode; and
  (c) an electrolyte,
  wherein the two or more groups of particles having differing chemical compositions comprises a first group of particles and a second group of particles, wherein:
  (a) the first group of particles comprises an inner and an outer region, wherein the inner region comprises a cubic spinel manganese oxide, and the outer region comprises a manganese oxide that is enriched in $Mn^{+4}$ relative to the inner region, and
  (b) the second group of particles comprises a material selected from materials of the formula $A^1_a M^1_b (XY_4)_c Z_d$; materials of the formula $A^2_e M^3_f O_g$; and mixtures thereof.

2. The battery of claim 1, comprising a material of the formula $A^1_a M^1_b (XY_4)_c Z_d$.

3. The battery of claim 1, comprising a material of the formula $A^1_a M^1_b XY_4 Z_d$.

4. The battery of claim 1, comprising a material of the formula $A^1_a M^1_b (XY_4)_3 Z_d$.

* * * * *

UNITED STATES PATENT AND TRADEMARK OFFICE
CERTIFICATE OF CORRECTION

PATENT NO.       : 7,771,628 B2                                     Page 1 of 1
APPLICATION NO.  : 11/381602
DATED            : August 10, 2010
INVENTOR(S)      : Jeremy Barker, M. Yazid Saidi and Tracy Kelley It is certified that error appears in the above-identified patent and that said Letters Patent is hereby corrected as shown below:

Column 13
Line 57: Delete "$M^5$" Insert --$M^{15}$--

Column 15
Line 49: Delete "$F_{0.025}$" Insert --$F_{0.25}$--

Column 27
Line 20: Delete "$P_4$" Insert --$PO_4$--

Signed and Sealed this
Nineteenth Day of June, 2012

David J. Kappos
*Director of the United States Patent and Trademark Office*